INVENTOR.
ARTHUR J. SCHAGER
BY
Tilberry & Body
ATTORNEYS

INVENTOR.
ARTHUR J. SCHAGER
BY
Tilberry & Body
ATTORNEYS

INVENTOR.
ARTHUR J. SCHAGER
BY
Tilberry & Body
ATTORNEYS

INVENTOR.
ARTHUR J. SCHAGER
BY
Tilberry & Body
ATTORNEYS

CONDITION AND TROUBLE SWITCHES

INVENTOR.
ARTHUR J. SCHAGER
BY Tilberry & Body
ATTORNEYS

INVENTOR.
ARTHUR J. SCHAGER
BY
Tilberry & Body
ATTORNEYS

INVENTOR.
ARTHUR J. SCHAGER
BY
Tilberry & Body
ATTORNEYS

INVENTOR.
ARTHUR J. SCHAGER
BY
Tilberry & Body
ATTORNEYS

United States Patent Office 3,237,318
Patented Mar. 1, 1966

3,237,318
APPARATUS FOR SIMULATING THE OPERATION OF AN ELECTRICAL POWER GENERATING PLANT

Arthur J. Schager, 26913 N. Woodland Road, Beachwood, Ohio

Filed July 23, 1963, Ser. No. 297,079
6 Claims. (Cl. 35—10)

This invention relates to training devices and, more particularly, to an apparatus for simulating the operation of a functional system. While the invention is of general utility insofar as the operation and control of such systems is concerned, it has particular utility in simulating the operation of electrical power generating plants and its structural arrangement and operation for use in that environment will be described herein.

In order to keep up with the steadily increasing demand for more electrical power, the trend of development in electrical power generating plants has been toward greater complexity of equipment and more efficient performance in the control and operation of this equipment. As a direct result of this increase in complexity of equipment and performance demands, it is essential, for reasons of safety to human life and economy of operation, that the personnel responsible for the operation and maintenance of the generating station be thoroughly trained at the outset and periodically "refreshed" in order to assure complete familiarity with the equipment and operational procedures. Accordingly, it is the principle object of this invention to facilitate this essential training need by providing a device which simulates the operation of a power generating plant.

In the absence of the apparatus of this invention, the standard procedure for training personnel in the operation of power generating plants was at best a long and laborious procedure which, for the most part, consisted of associating the trainee with a skilled operator. In addition, the training program also included the study of a large volume of descriptive and instruction material associated with the hundreds of units and components which make up a power generating plant. It is an object of this invention to provide a device for visually demonstrating the cooperative relationship of the units and components which make up the power generating system and the sequence of operations of the units.

Since the operation of a power generating plant must of necessity be continuous, it was impossible to satisfactorily train and test operators adequately in many of the operating sequences and emergency procedures. Instead, the trainee-operator for the most part could only become acquainted with these conditions and remedial procedures on a theoretical basis. Accordingly, it is a still further object of this invention to provide a training device which may be used to simulate the many operating sequences and emergency procedures and thereby thoroughly train operators without risk to personnel or equipment.

A still further and more particular object of this invention is to visually demonstrate and thereby familiarize plant personnel with all phases of interlocking circuit effects and results of removing components to prevent false and costly tripouts.

A still further object of this invention is to provide a training device which can be left available for use by anyone, without supervision at any time, and without danger to actual plant equipment or interruption of power generation.

According to this invention the foregoing objects are attained by providing apparatus for simulating the conditions of operation in a functional system, such as an electrical power generating plant. The apparatus includes a panel and condition indicating means, such as lamps on the panel for representing various operational conditions of the system. Further, the apparatus may include an electrical circuit connecting control means, such as switches, to the condition indicating means or lamps for controlling the energization thereof to thereby simulate various operating conditions of the equipment. Also, the panel may include a display portion graphically illustrating in flow pattern form the arrangement of the equipment components of the system. The panel may also include an alarm lamp portion including a plurality of alarm lamps for simulating various alarm conditions of the functional system. Still further, the condition indicating means or lamps may be located on the display portion of the panel for representing the various equipment components of the system and their condition of operation.

The foregoing as well as other objects and advantages will become apparent from the following description used to illustrate the preferred embodiment of the present invention, as read in connection with the accompanying drawings, in which:

FIGURE 1 illustrates the panel face of the preferred embodiment of the invention including a display portion A, an alarm lamp portion B, an operating switch portion C and a condition and trouble switch portion D;

FIGURES 1*a* and 1*b* are enlarged views of display portion A respectively taken on the left and right hand sides of line A—A in FIGURE 1, graphically illustrating in flow pattern form the layout and arrangement of equipment components in a simulated electrical power generating plant;

Figure 5:
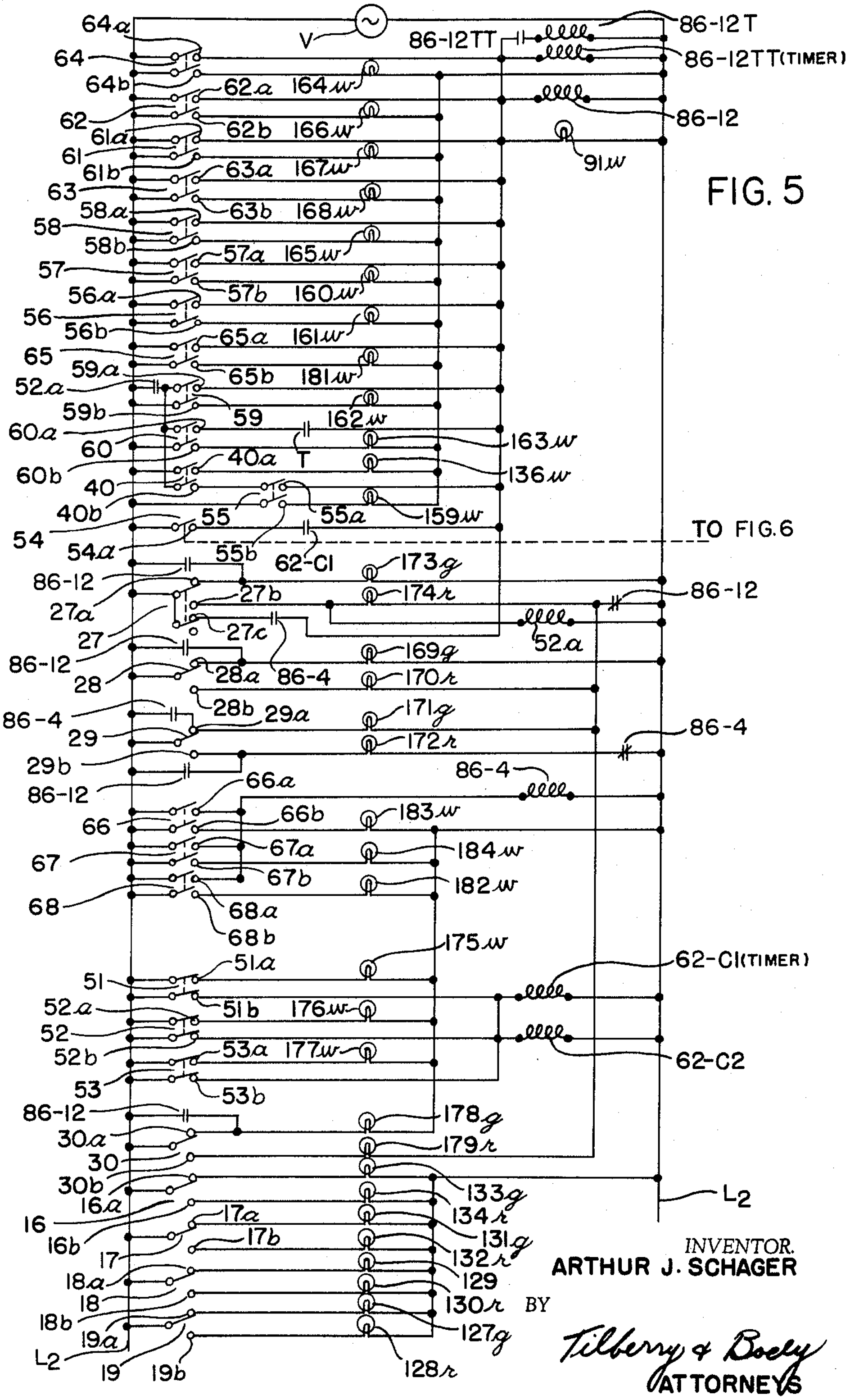
Figure 6:
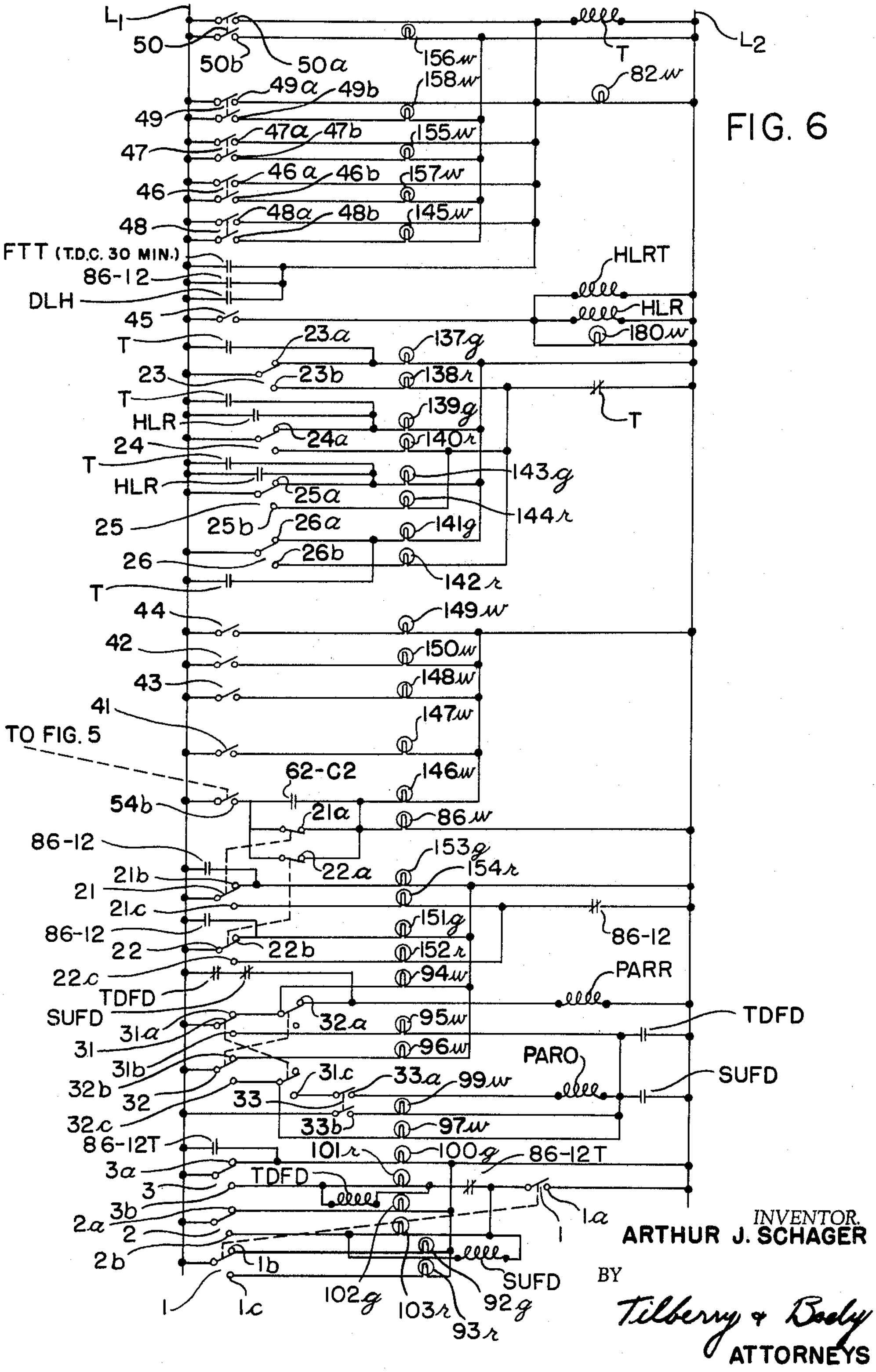
Figure 7:
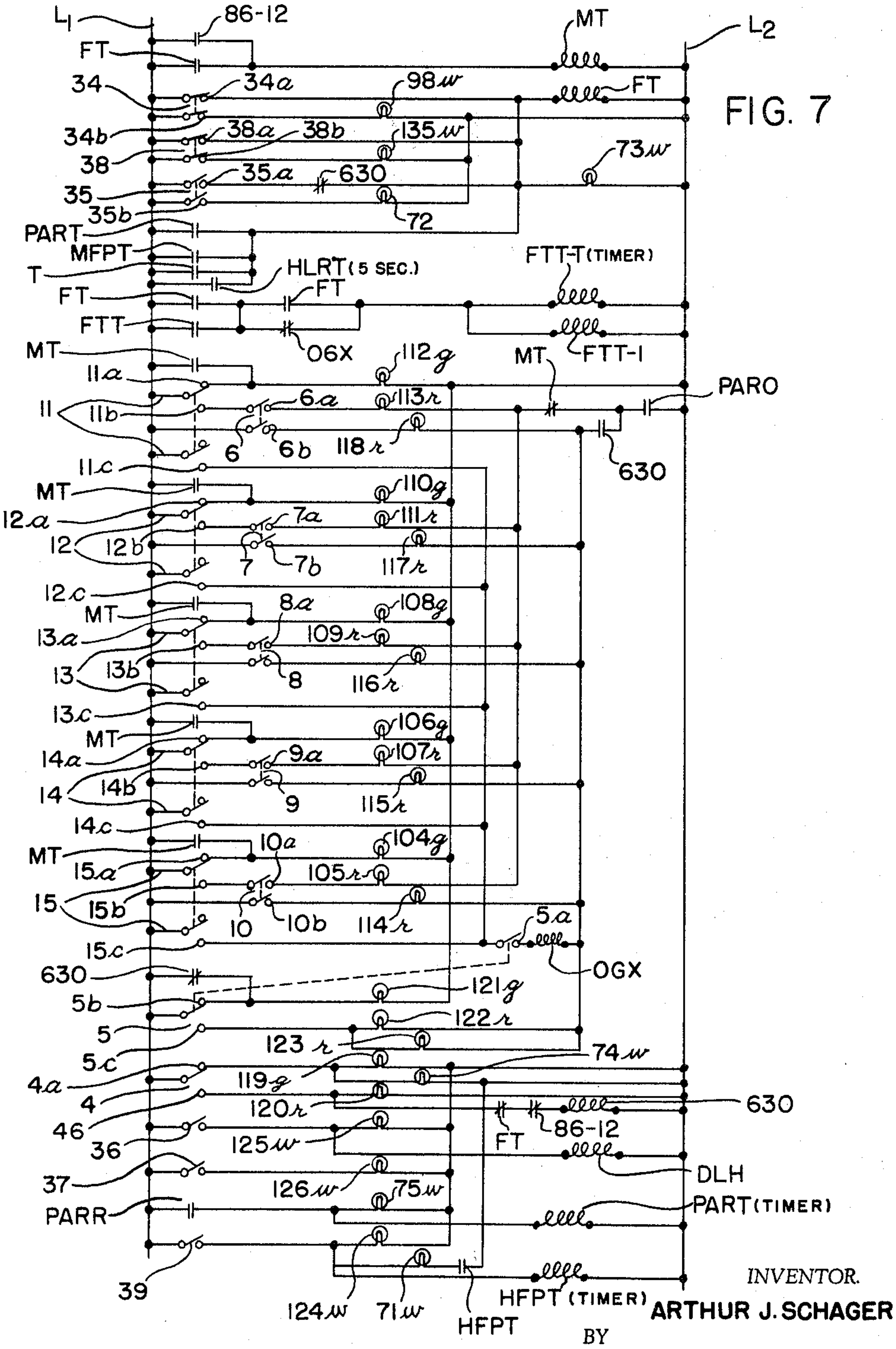

FIGURES 5, 6 and 7 together illustrate a schematic circuit diagram of the preferred electric circuit to be used in this invention.

Figure 1:
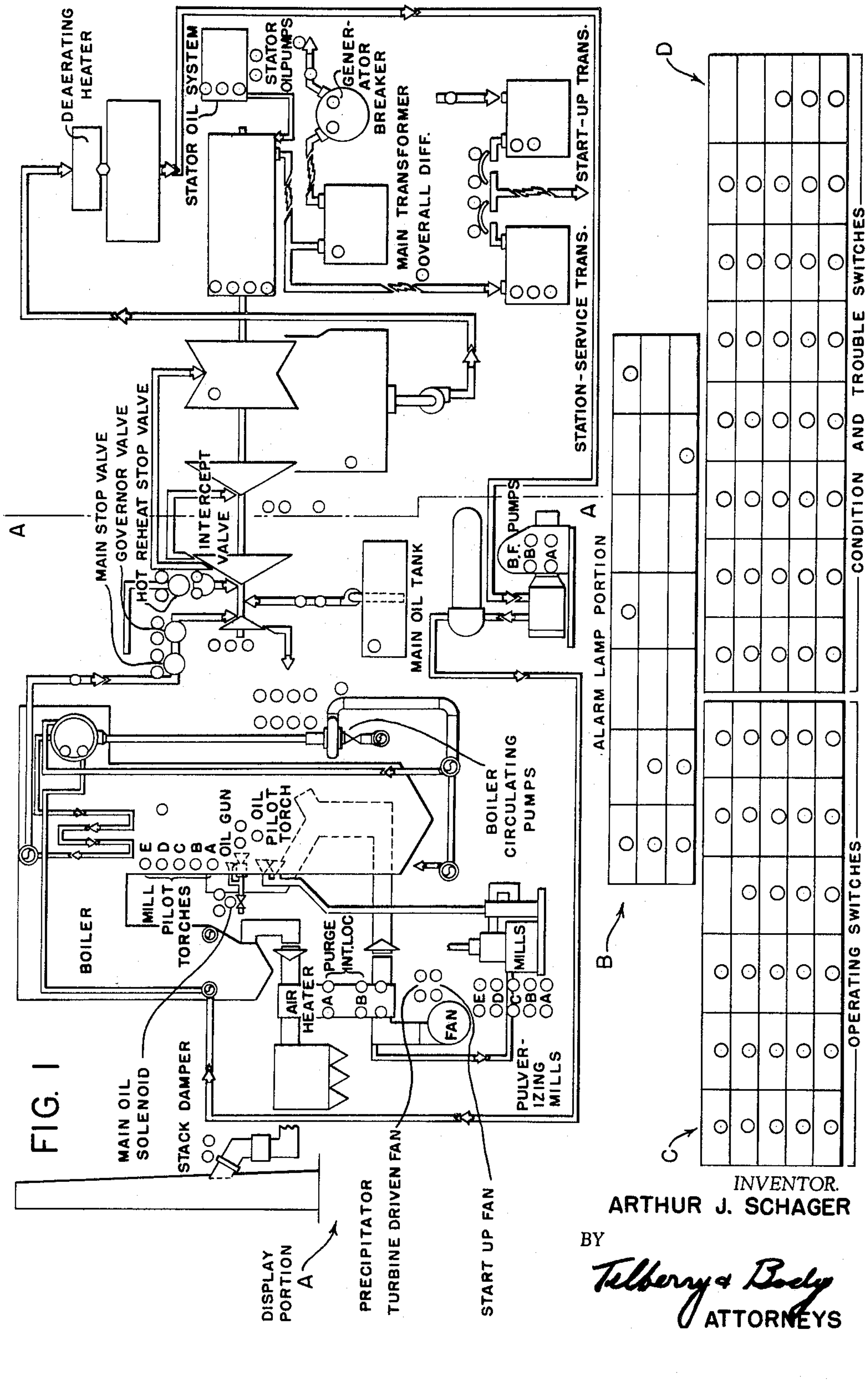
Figure 1A:
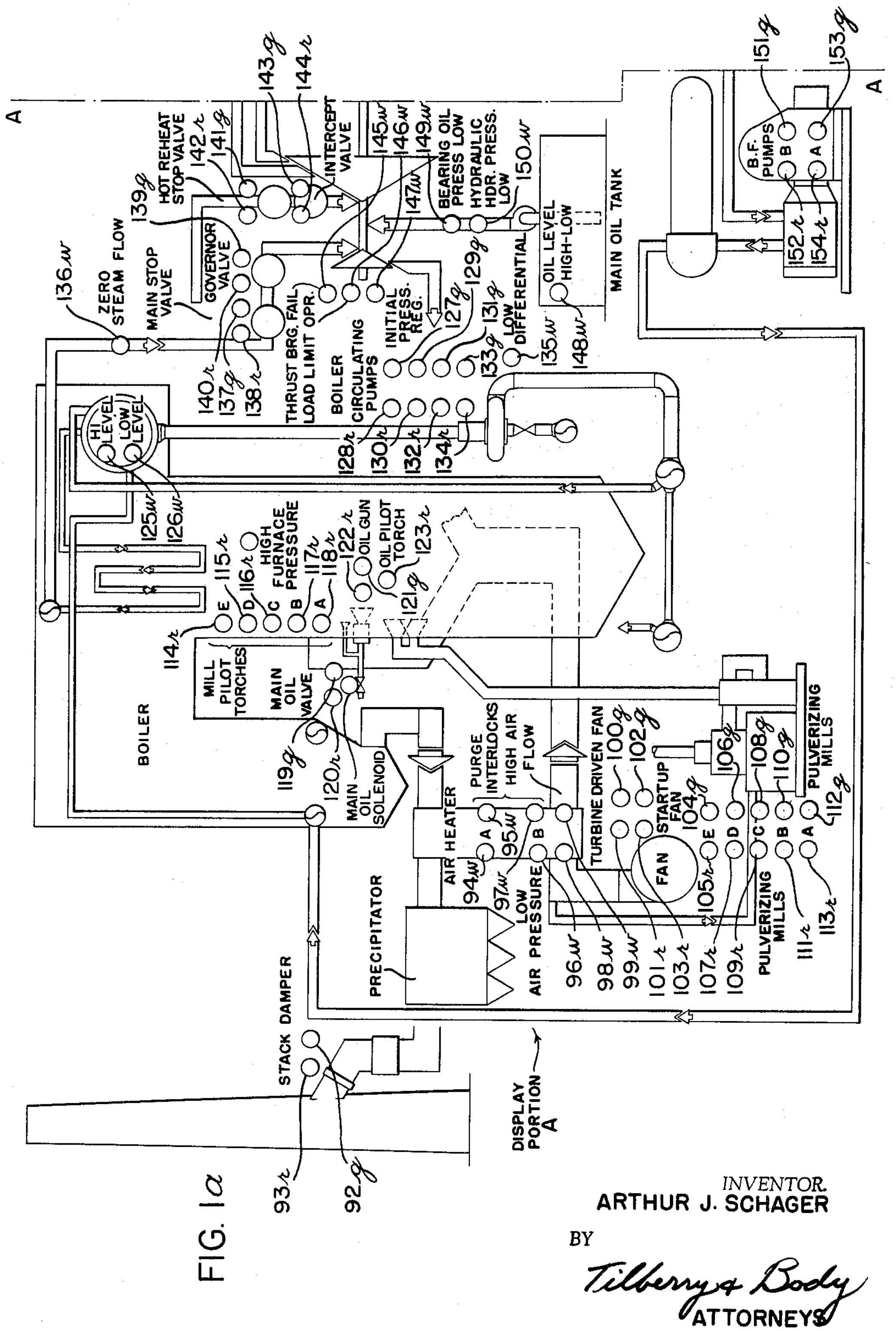
Figure 1B:
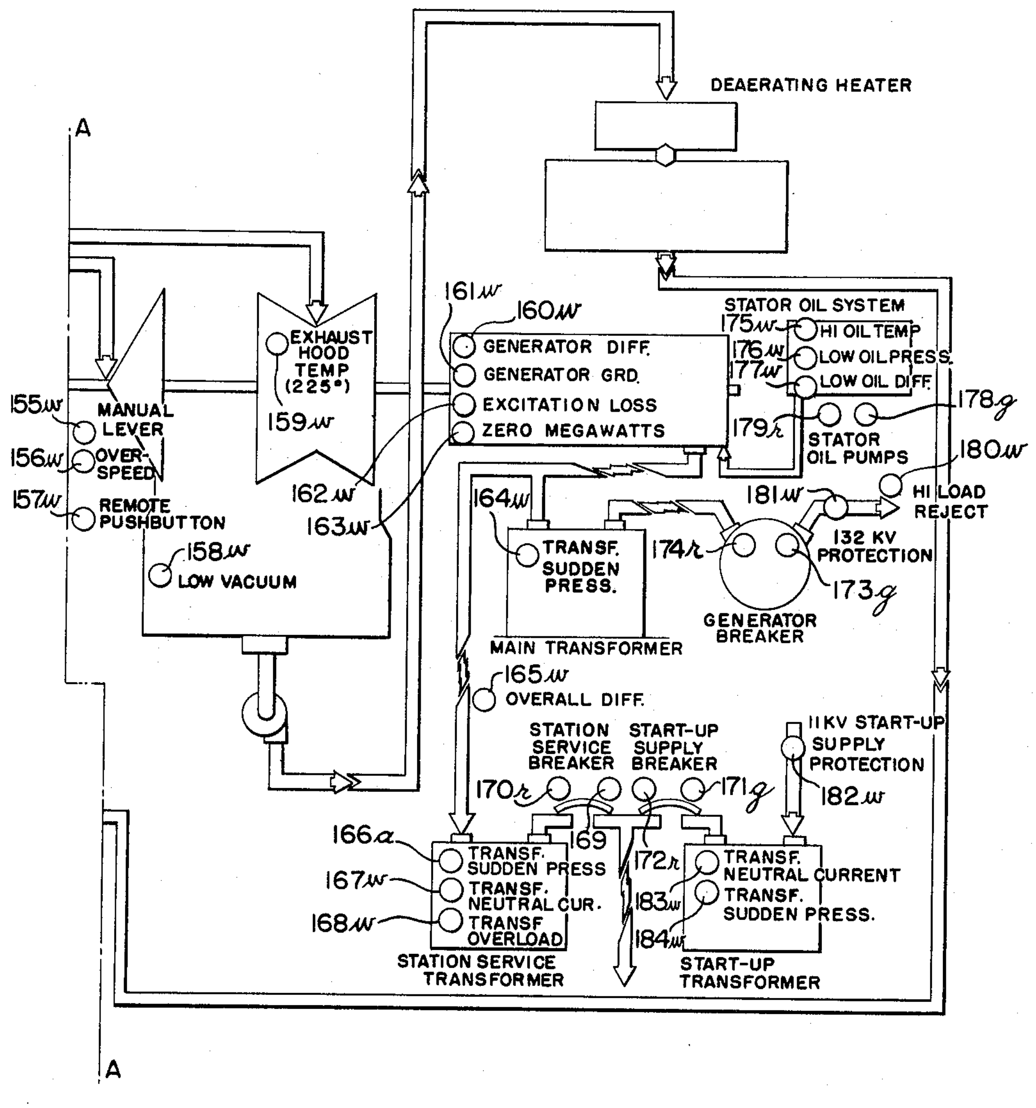

Referring now to the drawings, wherein the figures are shown for purposes of illustrating the preferred embodiment of the present invention only and not for purposes of limiting same, FIGURE 1 illustrates a control panel face. The panel face includes display portion A which graphically illustrates in flow pattern the layout and arrangement of equipment components in a simulated electrical power generating plant. Display portion A also mounts a plurality of component condition indicator lamps, numbered 92 through 184 (FIGURES 1*a* and 1*b*). At least one indicator lamp is positioned adjacent each of the components of the graphically illustrated equipment so as to indicate the condition of the component. Further, a descriptive label appears on the face of display portion A adjacent each component represented and for each condition of operation or malfunction simulated. Red lamps are indicated by subscript $r$, green lamps are indicated by subscript $g$ and white lamps are indicated by subscript $w$. The red and green lamps are component operation indicating lamps and represent the various equipment components of the plant and their condition of operation. The red lamps represent that the component associated therewith is operating in a correct manner. Green lamps represent that the component associated therewith is not operating. White lamps are either component malfunction or alarm indicating lamps for respectively simulating whether various component malfunctions or generator plant alarm conditions exist as depicted by the associated descriptive labels.

Figure 2:
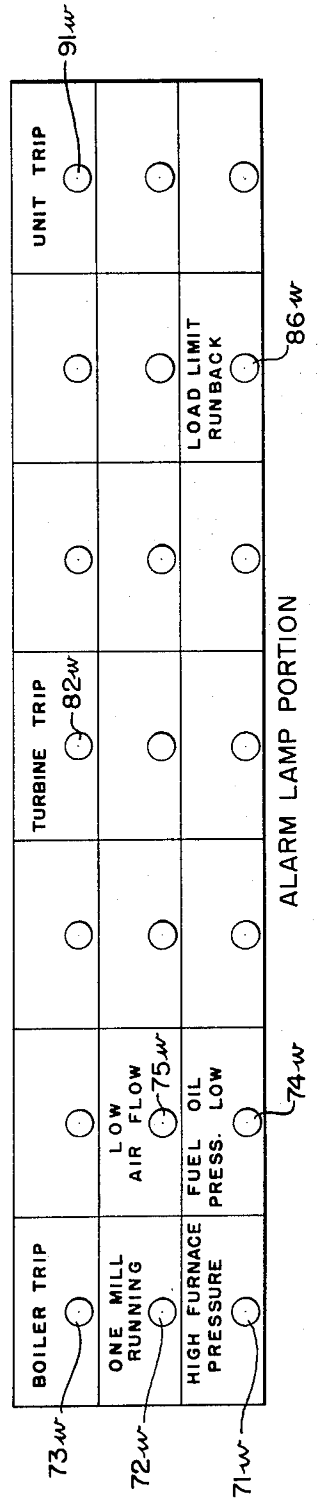
FIGURE 2 is an enlarged view illustrating the alarm lamp portion B of FIGURE 1.

Immediately below display portion A there is mounted on the panel, as shown in FIGURE 1, an alarm lamp portion B including eight power plant alarm condition lamps, numbered 71*w*, 72*w*, 73*w*, 74*w*, 75*w*, 82*w*, 86*w* and 91*w*. These lamps and descriptive labels therefor, which appear on the face of the panel, are shown in greater detail in FIGURE 2. All of the lamps mounted on alarm lamp portion B are white lamps and each lamp indicates that a particular alarm condition exists. Thus, white lamp 71*w*, when on, indicates that a high furnace pressure condition exists. White lamp 72*w*, when on, indicates that one mill is running. White lamp 73*w*, when on, indicates that a boiler trip condition exists. White lamp 74*w*, when on, indicates that the fuel oil pressure is low. White lamp 75*w*, when on, indicates that low air flow conditions exist. White lamp 82*w*, when on, indicates that a turbine trip condition exists. White lamp 86*w*, when on, indicates that load limit runback conditions exist. Lastly, white lamp 91*w*, when on, indicates that a unit trip exists. The significance of the above referred to alarm conditions will be more readily understood from the description of operation which follows.

Figure 3:
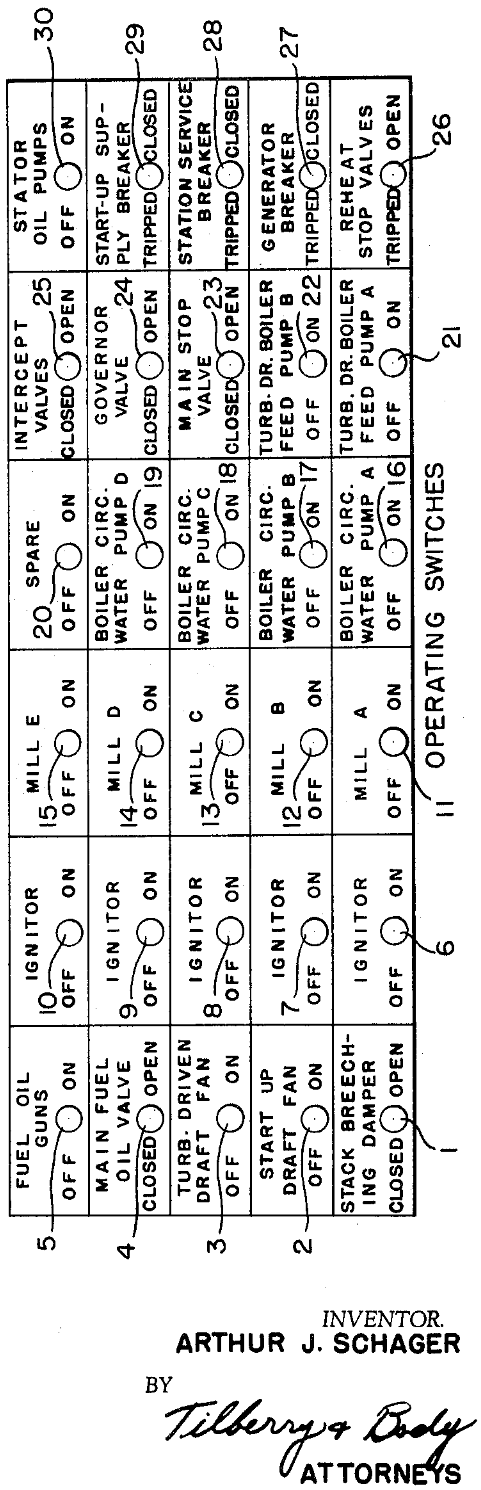
FIGURE 3 is an enlarged view illustrating the operating switch portion C of FIGURE 1.

Immediately below and to the left of the alarm lamp portion B there is provided on the control panel face an operating switch portion C. As shown in greater detail in FIGURE 3, the operating switch portion C comprises switches 1 through 30 and an equal number of descriptive labels therefor on the panel. Each of the operating switches 1 through 30 may be operated to simulate one of two conditions, as depicted by the descriptive labels associated with the switches, each condition being representative of a particular operation step in operating the simulated power generating plant.

Figure 4:
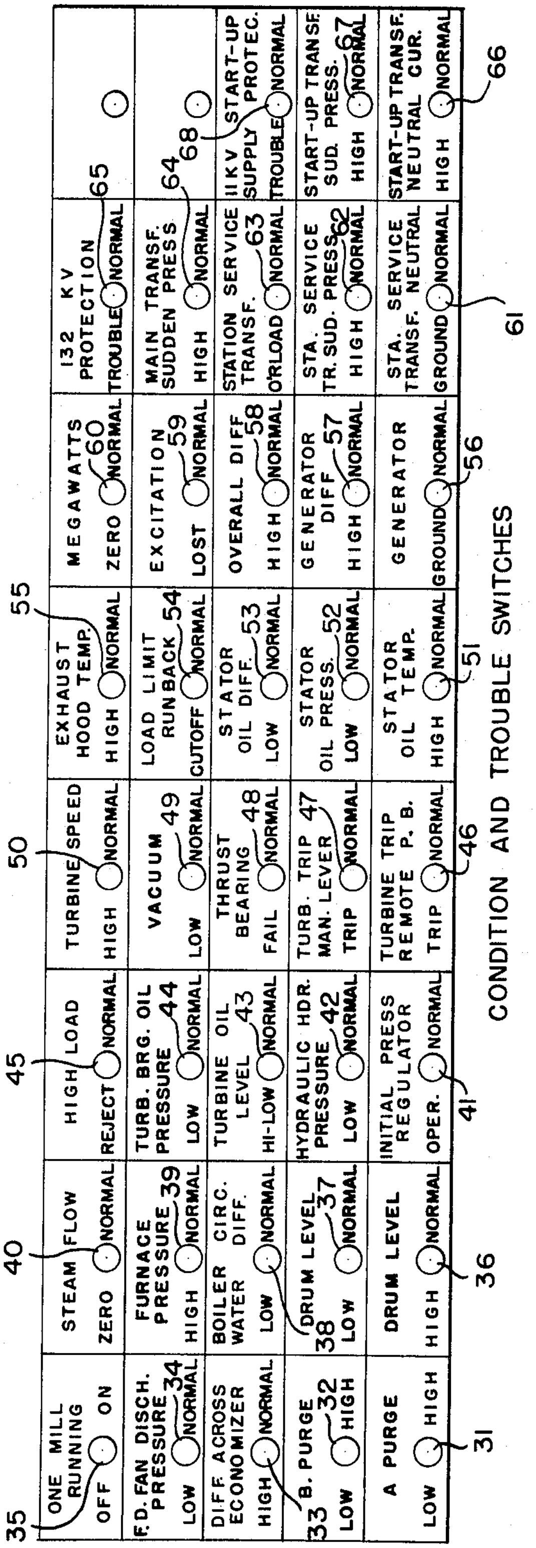
FIGURE 4 is an enlarged view illustrating the condition and trouble switch portion D of FIGURE 1.

Immediately below and to the right of alarm lamp portion B there is provided on the control panel face a condition and trouble switch portion D. As shown in greater detail in FIGURE 4, the condition and trouble switch portion D comprises switches 31 through 68 and an equal number of descriptive labels therefor on the panel. Each condition or malfunction is representative of a particular condition or malfunction which might occur during the operation of the power generating plant.

DESCRIPTION OF CIRCUIT DIAGRAM

Referring now to the circuit diagram illustrated in FIGURES 5, 6 and 7, there is shown an electrical circuit for interconnecting the switches 1 through 68 with the lamps 71 through 75, 82, 86 and 91 through 184 for indicating:

(a) The sequence of operation of the simulated electrical power generating plant;

(b) A simulated condition of each of the several components of the power generating plant; and (c) A simulated malfunction of each of the several components of the power generating plant.

Referring more particularly to the circuit diagram, switches 2, 3, 4, 16 through 19, 23 through 26, and 28 through 30 all take the form of single pole, double throw switches. Further, switches 36, 37, 39, and 41 through 45 all take the form of single pole, single throw switches. Switches 1, 5, 21 and 22 all take the form of double pole switches with one pole being single throw and the other pole being double throw. The remaining switches take the form of double pole, double throw switches. The invention is not limited to this particular combination of switches and it is apparent that other combinations of the switches will occur to those skilled in the art.

The circuit portions illustrated in FIGURES 5, 6 and 7 are all interconnected via lines or conductors $L_1$ and $L_2$ to form a complete circuit diagram. Referring specifically to the circuit portion shown in FIGURE 5 and starting at the top and proceeding to the bottom, there is shown an alternating voltage source V which preferably provides six (6) volts of alternating voltage. A relay coil 86–12T and a set of normally open relay contacts 86–12TT are connected together in series across a time delay relay coil 86–12TT and across the voltage source V via contact 64*a* of a main transformer sudden pressure switch 64. Switch 64 also connects white lamp 164*w* across source V via contact 64*b*. A relay coil 86–12 is connected in parallel with relay coil 86–12TT and across the voltage source V via contact 62*a* of a station service transformer sudden pressure switch 62. Switch 62 also connects white lamp 166*w* across source V via contact 62*b*. White lamp 91*w* is connected in parallel with relay coil 86–12 and across source V via contact 61*a* of a station service transformer neutral current switch 61. Switch 61 also connects white lamp 167*w* across source V via contact 61*b*. White alarm lamp 91*w* is also connected across source V via contact 63*a* of switch 63, contact 58*a* of switch 58, contact 57*a* of switch 57, contact 56*a* of switch 56, contact 65*a* of switch 65, contact 59*a* of switch 59 and a set of normally open contacts 52A, a set of normally open contacts T, contact 60*a* of switch 60 and normally opened contacts 52A, contact 55*a* of switch 55, contact 40*b* of switch 40 and normally open contacts 52A, a set of normally open three minutes time delay contacts 62–C1, contact 54*a* of switch 54, and a set of normally open contacts 86–4 and contact 27*c* of switch 27. Station service transformer overload switch 63 also serves to connect white lamp 168*w* across source V via contact 63*b*. Overall differential switch 58 connects white lamp 165*w* across source V via contact 58*b*. Generator differential switch 57 connects white lamp 160*w* across voltage source V via contact 57*b*. Generator ground switch 56 connects white lamp 161*w* across voltage source V via contact 56*b*. 132 kv. bus section protection switch 65 serves to connect white lamp 181*w* across source V via contact 65*b*. Loss of excitation switch 59 connects white lamp 162*w* across source V via contact 59*b*. "0" megawatts switch 160 connects white lamp 163*w* across source V via contact 60*b*, "0" steam flow switch 40 connects white lamp 136*w* across source V via contact 40*a*. Exhaust hood temperature switch 55 connects white lamp 159*w* across voltage source V via contact 55*b*.

A set of normally open relay contacts 86–12 and green lamp 173*g* are connected together in series across voltage source V. Green lamp 173*g* is also connected across source V via contact 27*a* of generator breaker switch 27. A set of normally closed relay contacts 86–12 and red lamp 174*r* are connected together in series and across voltage source V via contact 27*b* of switch 27. A relay coil 52A is connected across red lamp 174*r* and normally closed contacts 86–12. Another set of normally open relay contacts 86–12 are connected in series with green lamp 169*g* across the voltage source V. Station service breaker switch 28 also connects green lamp 169*g* across source V via contact 28*a*. A red lamp 170*r* is connected across the voltage source V via a set of normally closed contacts 86–12 and contact 28*b* of switch 28. A set of normally open relay contacts 86–4 are connected in series with green lamp 171*g* across voltage source V via a set of normally closed contacts 86–12. Start up supply breaker switch 29 also connects green lamp 171*g* across voltage source V via normally closed contacts 86–12 and contact 29*a*. Switch 29 also connects red lamp 172*r* across voltage source V via a set of normally closed contacts 86–4 and contact 29*b*. A set of normally open contacts 86–12 also serve to connect red lamp 172*r* across voltage source V via normally closed contacts 86–4.

A relay coil 86–4 is connected across source V via contact 66*a* of switch 66, or contact 67*a* of switch 67, or contact 68*a* of switch 68. Start up transformer neutral current switch 66 also serves to connect a white lamp 183*w* across voltage source V via contact 66*b*. Start up transformer sudden pressure switch 67 also serves to connect white lamp 184*w* across voltage source V via contact 67*b*. Further, the 11 kv. start up supply protection switch 68 also serves to connect white lamp 182*w* across voltage source V via contact 68*b*.

A timer relay coil 62–C1 is connected across the voltage source V via either contact 51*b* of switch 51, or contact 52*b* of switch 52, or contact 53*b* of switch 53. Another relay coil 62–C2 is connected in parallel with timer relay coil 62–C1. The stator oil temperature high switch 51 also serves to connect white lamp 175*w* across voltage source V via contact 51*a*. The stator oil pressure low switch 52 also serves to connect white lamp 176*w* across voltage source V via contact 52*a*. Stator oil differential low switch 53 serves to connect white lamp 177*w* across voltage source V via contact 53*a*.

A set of normally open contacts 86–12 serve to connect green lamp 178*g* across voltage source V. Further, stator oil pump 30 also serves to connect green lamp 178*g* across voltage source V. Further, stator oil pump 30 also serves to connect green lamp 178*g* across voltage source V via contact 30*a*. Switch 30 also connects red lamp 179*r* across voltage source V via a set of normally closed contacts 86–12 and contact 30*b*.

"A" boiler circulating pump switch 16 serves to respectively connect green lamp 133*g* and red lamp 134*r* across voltage source V via contact 16*a* and contacts 16*b*. Similarly, "B" boiler circulating pump switch 17 serves to connect green lamp 131*g* and red lamp 132*r* across the voltage source V via contact 17*a* and 17*b*, respectively. Further, "C" boiler circulating pump switch 18 serves to connect green lamp 129*g* and red lamp 130*r* across voltage source V via contacts 18*a* and 18*b*, respectively. Still further, "D" boiler circulating pump switch 19 serves to connect green lamp 127*g* and red lamp 128*r* across voltage source V via contacts 19*a* and 19*b*, respectively.

Referring now particularly to FIGURE 6, there is shown a continuation of conductors $L_1$ and $L_2$ and starting from the top and proceeding to the bottom, there is illustrated a relay coil T connected across conductors $L_1$ and $L_2$ and hence the voltage source V via contact 50*a* of switch 50. Overspeed switch 50 also serves to connect white lamp 156*w* across voltage source V via contact 50*b*. White alarm lamp 82*w* is connected in parallel with relay coil T and across the voltage source V via either contact 49*a* of switch 49, or contact 47*a* of switch 47, or contact 46*a* of switch 46, or contact 48*a* of switch 48, or a set of normally open contacts FTT which simulate thirty (30) minutes time delay, or a set of normally open contacts 86–12, or a set of normally open contacts DLH. Low vacuum switch 49 also serves to connect white lamp 158*w* across voltage source V via contact 49*b*. Manual level switch 47 also serves to connect white lamp 155*w* across voltage source V via contact 47*b*. Remote pushbutton switch 46 also serves to connect white lamp 157*w* across voltage source V via contact 46*b*. Thrust bearing failure switch 48 also serves to connect white lamp 145*w* across voltage source V via contact 48*b*.

White lamp 180*w* and high load reject relay coils HLR and HLTR are connected together in parallel and across the voltage source V via high load reject switch 45. A normally open set of contacts T connect green lamp 137*g* across voltage source V. Green lamp 137*g* is also connected across voltage source V via contact 23*a* of switch 23. Main stop valve switch 23 also serves to connect red lamp 138*r* across voltage source V via a set of normally closed contacts T and contact 23*b*. Another set of normally open contacts T and a set of normally open contacts HLR are connected together in parallel and serve to connect green lamp 139*g* across voltage source V. Green lamp 139*g* is also connected across voltage source V via contact 24*a* of switch 24. The governor valve switch 24 also serves to connect red lamp 140*r* across voltage source V via a set of normally closed closed contacts HLR and a set of normally closed contacts T and contact 24*b*. Another set of normally open contacts T and another set of normally open contacts HLR are connected together in parallel and serve to connect green lamp 143*g* across voltage source V. Green lamp 143*g* is also connected across voltage source V via contact 25*a* of switch 25. Intercept valve switch 25 also serves to connect red lamp 144*r* across voltage source V via normally closed contacts HLR, normally closed contacts T and contact 25*b*. A still further set of normally open contacts T serve to connect green lamp 141*g* across voltage source V. Green lamp 141*g* is also connected across voltage source V via contact 26*a* of switch 26. Reheat stop valve switch 26 also serves to connect red lamp 142*r* across voltage source V via a set of normally closed contacts T and contact 26*b*.

White lamps 147*w*, 148*w*, 149*w* and 150*w* are respectively connected across voltage source V via initial pressure regulator switch 41, oil level high-low switch 43, turbine bearing oil pressure low switch 44 and hydraulic pressure low switch 42. Further, load limit runback cutoff switch 54 serves to connect white lamp 146*w* across voltage source V via a set of normally open contacts 62–2C and contact 54*b*. White alarm lamp 86*w* is connected in parallel with white lamp 146*w* and is connected across voltage source V via parallel paths including contact 21*a* of switch 21 and contact 22*a* of switch 22. A set of normally open contacts 86–12 serve to connect green lamp 153*g* across voltage source V. Green lamp 153*g* is also connected across voltage source V via contact 21*b* of switch 21. Turbine drive boiler feed pump "A" switch 21 also serves to connect red lamp 154*r* across voltage source V via a set of normally closed contacts 86–12 and contact 21*c*. Another set of normally open contacts 86–12 serves to connect green lamp 151*g* across voltage source V. Green lamp 151*g* is also connected across source V via contact 22*b* of switch 22. Turbine drive boiler feed pump "B" switch 22 also serves to connect red lamp 152*r* across voltage source V via a set of normally closed contacts 86–12 and contact 22*c*. White lamp 94*w* is connected across the voltage source V via contact 31*a* of switch 31. "A" purge switch 31 also serves to connect latch relay coil PARR across voltage source V via contact 32*a* of switch 32 and contact 31*a*. The PARR relay coil is also connected across the source V via a set of normally closed contacts SUFD and a set of normally closed contacts TDFD. Switch 31 also serves to connect white lamp 95*w* across voltage source V via a set of normally open contacts TDFD and contact 31*b*. "B" purge switch 32 also serves to connect white lamp 96*w* across voltage source V via contact 32*b*. Switch 32 also serves to connect latch relay coil PARO across voltage source V via a set of normally open contacts SUFD, contact 33*a* of switch 33, contact 31*c* of switch 31 and contact 32*c*. Differential across economizer switch 33 also serves to connect white lamp 99*w* across voltage source V via parallelly connected normally opened contacts TDFD and SUFD and contact 33*b*. "A" purge switch 31 also serves to connect white lamp 97*w* in parallel with the PARO relay coil. White lamp 97*w* may also be connected across the voltage source V by switch 32 via contact 32*c* and the parallelly connected normally open contacts SUFD and TDFD.

A set of normally open relay contacts 86–12T serve to connect green light 100*g* across voltage source V. Green lamp 100*g* is also connected across voltage source V via contact 3*a* of switch 3. Turbine driven draft fan switch 3 also serves to connect red lamp 101*r* and a relay coil TDFD connected in parallelly therewith across voltage source V via a set of normally closed contacts 86–12T, contact 1a of switch 1 and contact 3b. A green lamp 102g is connected across voltage source V via contact 2a of switch 2. Start up draft fan switch 3 also serves to connect red lamp 103r and a relay coil SUFD connected in parallel therewith across voltage source V via contact 2b and contact 1a of switch 1. Green lamp 92g is connected across voltage source V via contact 1b of switch 1. Stack breeching damper switch 1 also serves to connect red lamp 93r across voltage source V via contact 1c.

Referring now specifically to the portion of the circuit diagram illustrated in FIGURE 7, there is shown a continuation of conductors $L_1$ and $L_2$. Starting from the top and proceeding to the bottom there is shown a relay coil MT connected across conductors $L_1$ and $L_2$ and hence across voltage source V via a pair of parallelly connected normally open relay contacts 86–12 and FT. A relay coil FT is connected across voltage source V via contact 34a of switch 34, or contact 38a of switch 38, or a set of normally closed contacts 630 and contact 35a of switch 35, or the parallelly connected normally open contacts PART, MFPT, T, HLRT. FD fan discharge pressure switch 34 also serves to connect white lamp 98w across voltage source V via contact 34b. Boiler circulator water differential switch 38 also serves to connect white lamp 135w across voltage source V via contact 38b. One mill running switch 35 also serves to connect white alarm lamp 72w across voltage source V via contact 35b. White alarm lamp 73w is connected in parallel with relay coil FT so as to be energized when the FT relay coil is energized.

Parallelly connected relay coils FTT–T (timer) and FTT–1 are connected across voltage source V via a pair of series connected normally open contacts FT having a set of normally closed contacts OGX connected in parallel with one set of FT contacts, and a set of normally open FTT contacts in parallel with the other set of FT contacts.

A set of normally opened contacts MT serve to connect green lamp 112g across voltage source V. Green lamp 112g is also connected across voltage source V via contact 11a of switch 11. "A" mill switch 11 also serves to connect red lamp 113r across voltage source V via contact 11b, contact 6a of switch 6, a set of normally closed contacts MT and a set of normally opened contacts PARO. "A" pilot torch switch 6 also serves to connect red lamp 118r across voltage source V via contact 6b, a set of normally open contacts 630 and a set of normally open contacts PARO. Switch 11 also serves to connect relay coil OGX across voltage source V via contact 11c, contact 5a of switch 5, normally open contacts 630 and normally open contacts PARO. Another set of normally open contacts MT serve to connect green lamp 110g across the voltage source V. Green lamp 110g is also connected across the source via contact 12a of switch 12. "B" mill switch 12 also serves to connect red lamp 111r across voltage source V via normally closed contacts MT and normally open contacts PARO, contact 7a of switch 7 and contact 12b. "B" pilot torch switch 7 also serves to connect red lamp 117r across voltage source V via normally opened contacts 630 and PARO, and contact 7b. Switch 12 also serves to connect relay coil OGX across voltage source V via normally open contacts 630 and PARO via contact 5a of switch 5 and contact 12c.

A still further set of MT contacts serve to connect green lamp 108g across voltage source V. Green lamp 108g is also connected across the voltage source V via contact 13a of switch 13. "C" mill switch 13 also serves to connect red lamp 109r across voltage source V via contact 13b, contact 8a of switch 8, normally closed contacts MT and normally open contacts PARO. "C" pilot torch switch 8 also serves to connect red lamp 116r across voltage source V via normally opened contacts 630 and PARO. Switch 13 also serves to connect relay coil OGX across source V via contact 13c, contact 5a of switch 5 and normally open contacts 630 and PARO. A still further set of normally open contacts MT serve to connect green lamp 106g across voltage source V. Green lamp 106g is also connected across the source via contact 14a of switch 14. "D" mill switch 14 also serves to connect red lamp 107r across voltage source V via contact 14b, contact 9a of switch 9, and normally open contacts 630 and PARO. Switch 14 also serves to connect relay coil OGX across voltage source V via contact 14c, contact 5a of switch 5 and normally open contacts 630 and PARO. A still further set of normally open contacts MT serve to connect green lamp 104g across voltage source V. Green lamp 104g is also connected across the voltage source V via contact 15a of switch 15. "E" mill switch 15 also serves to connect red lamp 105r across the voltage source V via normally closed relay contacts MT, normally open contacts PARO, contact 15b and contact 10a of switch 10. "E" pilot torch switch 10 also serves to connect red lamp 114r across voltage source V via contact 10b and normally open contacts 630 and PARO. Switch 15 also serves to connect relay coil OGX across voltage source V via contact 15c, contact 5a of switch 5 and normally open contacts 630 and PARO. Green lamp 121g is connected across voltage source V via a set of normally closed contacts 630. Green lamp 121g is also connected across voltage source V via contact 5b of switch 5. Oil guns switch 5 also serves to connect parallelly connected red lamps 112r and 123r across voltage source V via contact 5c and normally open contacts 630 and PARO.

Green lamp 119g and white alarm lamp 74w are connected together in parallel across voltage source V via contact 4a of switch 4. Fuel oil solenoid switch 4 also serves to connect red lamp 120r, which is connected in parallel with a series circuit including normally closed contacts FT, normally closed contacts 86–12 and a relay coil 630 across voltage source V via contact 4b. White lamp 125w is connected across voltage source V via switch 36. Drum level high switch 36 also serves to connect relay coil DLM across voltage source V. Drum level low switch 37 serves to connect white lamp 126w across voltage source V. White alarm lamp 75w is connected in parallel with a timer relay coil PART and across voltage source V via a set of normally open contacts PARR. White lamp 124w is connected in parallel with a series circuit including white alarm lamp 71w and a set of normally open contacts HFPT and also in parallel with a timer relay coil HFPT across the voltage source V via high furnace pressure switch 39. Having described the structure of the preferred embodiment of the invention, attention will now be directed toward the operation.

DESCRIPTION OF OPERATION

The simulator according to this invention may be used to simulate the important major sequences of safe and proper operation of an electric power generating plant. However, prior to such use the simulator must be placed in an initial condition corresponding to a no-load, standby condition of the simulated power plant.

First, in the operating switch portion "C" switches 2, 3, 5 to 19, 21, 22 and 30 should be placed in the "OFF" position. Place switches 1, 4, 23, 24 and 25 in the "CLOSED" position. Further, place switches 26, 27, 28 and 29 in the "TRIPPED" position.

Second, in the condition and trouble portion "D" place switches 31, 32, 34, 38, 52 and 53 in the "LOW" position. Place switch 35 in the "OFF" position. Also, place switches 33, 36, 37, 39 to 50, 54 to 68 in the "NORMAL" position.

With the circuit of the simulator connected across voltage source V via lines $L_1$ and $L_2$ and with the various switches positioned as indicated above and as shown in FIGURES 5, 6 and 7, the various relays and lamps are in the condition indicated by Table 1.

*Table I*

| | |
|---|---|
| Relays: | |
| 86-12T | Turbine Drive FD Fan Trip—de-energized. |
| 86-12TT | Operates 86-12T-de-energized. |
| 86-12 | Unit Trip Relay—de-energized. |
| 52-A | Generator Breaker Closed Interlock—de-energized. |
| 86-4 | Start up Transformer Protection—de-energized. |
| 62-C1 | (Timer) Load Limit Runback, Unit Trip Interlock-energized. |
| 62-C2 | Load Limit Runback Back, Interlock-energized. |
| T | Turbine Trip—de-energized. |
| HLRT | (Timer) High Load Reject—de-energized. |
| HLR | High Load Reject—de-energized. |
| Par | Latching Relay with PARR Coil energized and PARO Coil de-energized. |
| TDFD | Turbine Driven FD Fan Running Interlock—de-energized. |
| SUFD | Start Up Fan Running, Interlock—de-energized. |
| MT | Mill Trip—energized. |
| FT | Fuel Trip Interlock—energized. |
| FTT-T | Turbine Trip Interlock—energized. |
| FTT-1 | Turbine Trip Interlock—energized. |
| OGX | One Mill Running Interlock—de-energized. |
| 630 | Pilot Torch Interlock—de-energized. |
| DLH | Drum Level High Interlock—de-energized. |
| PART | (Timer) Purge Time Interlock Completion—energized. |
| HFPT | (Timer) High Furnace Pressure Interlock—de-energized. |
| Lamps in Display Portion A: | |
| Stack Damper | Green lamp 92w "on," Red 93 "off." |
| Purge Interlocks | White lamp 94w and 96w "on." White lamp 95w and 97w "off." |
| Low Air Flow | White lamp 75w "on." |
| High Air Flow | White lamp 99w "off." |
| Start up Fan | Green lamp 102g "on", Red lamp 103r "off." |
| Turbine Driven Fan | Green lamp 100g "on", Red lamp 101r "off." |
| Pulverizer Mill | Green lamp 112g, 110g, 108g, 106g, 104g "on." |
| Pulverizer Mill | Red lamps 105r, 107r, 109r, 111r, 113r "off." |
| Main Solenoid | Green lamp 119g "on", Red lamp 120r "off." |
| Mill Pilot Torches | Red lamps 114r, 115r, 116r, 117r, 118r "off." |
| Oil Guns | Green lamp 121g "on", Red lamp 122r "off." |
| Oil Pilot Torches | Red lamp 123r "off." |
| High Furnace Press | White lamp 124w "off." |
| High Drum Level | White lamp 125w "off." |
| Low Drum Level | White lamp 126w "off." |
| Boiler Circulators | Green lamps 127g, 129g, 131g and 133g "on," Red lamps 128r, 130r, 132r, 134r "off." |
| Boiler Circulating Water Low Diff. | White lamp 135w "on." |
| Zero Steam Flow | White lamp 136w "off." |
| Main Stop Valves | Green lamp 137g "on", Red lamp 138r "off." |
| Governor Valves | Green lamp 139g "on," Red lamp 142r "off." |
| Hot Reheat Stops | Green lamp 141g "on", Red lamp 142r "off." |
| Intercept Valves | Green lamp 143g "on", Red lamp 144r "off." |
| Thrust Bearing Failure | White lamp 145w "off." |
| Load Limit Operation | White lamp 146w "off." |
| Initial Press Regulator | White lamp 147w "off." |
| Bearing Oil Press. Low | White lamp 149w "off." |
| Hydraulic Header Press. Low | White lamp 150w "off." |
| Oil Level High-Low | White lamp 148w "off." |
| Boiler Feed Pump | Green lamps 151g and 153g "on," Red lamps 152r and 154r "off." |
| Manual Lever | White lamp 156w "off." |
| Remote Pushbutton | White lamp 157w "off." |
| Low vacuum | White lamp 158w "off." |
| Exhaust Hood (225°) | White lamp 159w "off." |
| Generator Diff. | White lamp 160w "off." |
| Generator Ground | White lamp 161w "off." |
| Excitation Loss | White lamp 162w "off." |
| Zero Megawatts | White lamp 163w "off." |
| Main Trans. Sudden Pressure | White lamp 164w "off." |
| Overall Diff. | White lamp 165w "off." |
| Station Service Trans. Sudden Press | White lamp 166w "off." |
| Station Service Trans Neutral Current | White lamp 167w "off." |
| Station Service Trans. Overload | White lamp 168w "off." |
| Normal Supply Breaker | Green lamp 169g "on," Red lamp 170r "off." |
| Start Supply Breaker | Green lamp 171g "on," Red lamp 172r "off." |
| 11 kv. Station Start up Supply Protection. | White lamp 182w "off." |
| Start up Trans. Neutral Current. | White lamp 183w "off." |

*Table I*—Continued

| | |
|---|---|
| Relays—*Continued* | |
| Start up Trans. Sudden Pressure. | White lamp 184w "off." |
| Stator Oil Temp. High | White lamp 175w "off." |
| Stator Oil Low Press | White lamp 176w "off." |
| Stator Oil Diff. Low | White lamp 177w "on." |
| Stator Oil Pumps | Green lamp 178g "on," Red lamp 179r "off." |
| High Load Reject | White lamp 180w "off." |
| 132 kv. Protection | White lamp 181w "off." |
| Generator Breaker | Green lamp 173g "on," Red lamp 174r "off." |
| Lamps in Alarm Portion "B": | |
| Boiler Trip | White lamp 73w "on." |
| One Mill Running lamp | White lamp 72w "off." |
| High Furnace Press | White lamp 71w "off." |
| Low Air Flow | White lamp 75w "on." |
| Fuel Oil Press. Low | White lamp 74w "on." |
| Turbine Trip | White lamp 82w "off." |
| Load Limit Runback | White lamp 86w "off." |
| Unit Trip | White lamp 91w "off." |

(A) START UP SEQUENCE

The simulator of the present invention is now in proper condition for an operator to simulate start up procedure of the simulated power plant, indicated by the graphic flow pattern appearing on display portion "A" in FIGURE 1. The start up procedure should be in accordance with the following sequence of operation:

(1) Closure of the start up supply breaker, represented by lamps 172*r* and 171*g*, is simulated by placing the start up supply breaker switch 29 in the "closed" position. From FIGURE 5 it is apparent that green lamp 171*g* will be deenergized and red lamp 172*r* will be energized by voltage source V via contact 29*b* of switch 29 and a set of normally closed contacts 86–4, to thereby indicate that the start up supply breaker is closed and operating.

(2) Opening of the stack breeching damper, represented by lamps 92*g* and 93*r*, is simulated by placing switch 1 in the "open" position. The stack breeching damper is conventionally located at the base of the exhaust gas exit stack in a power generating plant. The function of the damper is to isolate the exit stack from the boiler when maintenance work is required. Closure of switch 1 (FIGURE 6) results in de-energizing green lamp 92*g* and energizing red lamp 93*r* to thereby indicate opening of the stack breeching damper.

(3) Energization of start up draft fan, represented by lamps 103*r* and 102*g*, is simulated by placing start up draft fan switch 2 in the "on" position and the FD fan discharge pressure switch 34 in the "normal" position. Conventionally the start up draft fan is a motor driven fan used to supply air for the combustion of fuel during the initial start up of the power plant when there is not sufficient steam available. Placing switch 2 (FIGURE 6) in the "on" position de-energizes green lamp 102*g* and energizes red lamp 103*r* via contact 1*a* of switch 1 and contact 2*b* of switch 2 to thereby indicate that the start up fan is energized. Further, placing switch 2 in the "on" position also energizes start up fan discharge relay SUFD via contact 1*a* of switch 1 and contact 2*b* of switch 2. Energization of the SUFD relay coil results in closure of the normally open SUFD contacts in the circuit of the PARO relay coil so as to thereby set up a permissive for purging. Energization of the relay coil SUFD also results in opening the normally closed SUFD contacts in the PARR relay coil circuit so as to thereby de-energize or release one-half of the parallel circuit of the PARR relay coil. Thus, upon placing either switch 31 or 32 in the "high" position, the PARR coil will be de-energized. At this time in the sequence of operation it will be noted that all normally closed SUFD contacts are closed and all normally closed SUFD contacts are open. Closure of switch 34 (FIGURE 7) by placing the switch in the "normal" position de-energizes white lamp 98w and releases part of the FT relay coil circuit.

(4) Placing a differential across the economizer, represented by white lamp 99*w*, is simulated by positioning switch 33 in the "high" position. This simulates proper air flow through the boiler to setup a purge permissive for the initial light off of the boiler to prevent furnace explosion. The differential is the result of air flow through the tube section.

Positioning switch 33 (FIGURE 6) in the "high" position results in energizing white lamp 99w via the normally open contacts SUFD in the PARO relay coil circuit, which closed by virtue of step 3. Also, by so positioning switch 33 a second phase of establishing a purge permissive circuit has been established, as will be apparent from the description which follows.

(5) Purging of the system, represented by purge interlock white lamps 94*w*, 95*w*, 96*w* and 97*w* is simulated by positioning A and B purge switches 31 and 32 in the "high" position. White lamps 94*w* and and 96*w* indicate low air flow and white lamps 95*w* and 97*w* indicate high air flow. Purging is conventionally required in the operation of a power plant to prevent boiler furnace explosions during initial light off or during normal operation if insufficient combustion air prevails.

Placing switches 31 and 32 in the "high" positions results in energizing white lamps 95*w* and 97*w* via previously closed contacts SUFD in the PARO relay coil circuit. Further, by so positioning switches 31 and 32 white lamps 94*w* and 96*w* are de-energized. This also de-energizes relay coil PARR and energizes relay coil PARO of the PAR latch relay. De-energization of relay coil PARR results in opening of contacts PARR (FIGURE 7) to thereby de-energize white lamp 75*w* and de-energize timer relay coil PART to thereby start purge time. Timing begins upon de-energization of relay coil PART. Further, by so positioning switches 31 and 32 all normally open PARR contacts are open and all normally closed PARR contacts are closed. Also by so positioning switches 31 and 32, the PARO normally open contacts are closed and the PARO normally closed contacts are opened. Thus, for example, the PARO normally closed contacts in the mill and pilot torch circuit (FIGURE 7) are closed so as to establish a purge interlock for starting the mills and pilot torches. The purge timer relay coil PART will time out two minutes and thereafter be de-energized so as to render the normally open PART contacts in the FT relay coil circuit open to release part of the parallel FT (Fuel Trip) relay coil circuit.

(6) Energization of "A" boiler feed pump, represented by lamps 153*g* and 154*r*, is simulated by placing switch 21 in the "on" position. The turbine boiler feed pump "A" in a conventional power plant is provided to supply water to the boiler under normal operating conditions. For example, such a pump can supply approximately 60% of full load requirements. As shown in the flow diagram in portion "A" (FIGURE 1*a*) a second such pump "B," represented by lamps 151*g* and 152*r*, is provided for full loading of the unit. By so positioning switch 21 (FIGURE 6) lamp 153*g* is de-energized and lamp 154*r* is energized via a set of normally closed contacts 86–12 and contact 21*c* of switch 21. Further, by so positioning switch 21 a portion of the parallel circuit for the load limit runback, represented by switch 54, is opened.

(7) Energization of "A," "B," "C," "D" boiler circulating pumps, respectively, represented by lamps 133*g* and 134*r*, 131*g* and 132*r*, 129*g* and 130*r*, 127*g* and 128*r*, is simulated by placing switches 16, 17, 18 and 19 in the "on" position and placing switch 38, the boiler circulating water differential switch in the "normal" position. The "A," "B," "C" and "D" boiler circulating pumps are conventionally located within the boiler circulating or flow loop and are used to insure adequate flow of water through all boiler wall tube areas to prevent burning out, or overheating of the tubes. Whereas four such pumps are represented in FIGURE 1, three are usually sufficient for normal full load operation of a power generating plant. By so positioning switches 16, 17, 18 and 19 (FIGURE 5) lamps 133*g*, 131*g*, 129*g*, and 127*g* will respectively be de-energized and lamps 134*r*, 132*r*, 130*r* and 128*r* will be energized to thereby indicate that the pumps are operating. By placing switch 38 (FIGURE 7) in the "normal" position, white lamp 135*w* will be deenergized and in addition a portion of the parallel circuit of the FT relay coil will be released.

At this stage in the sequence of operation, the FT (Fuel Trip) relay coil is completely de-energized. This is because switches 34 and 38 are now in their "open" or "normal" position and switch 35 is in its "open" position, and the normally open contacts PART, HFPT, T and HLRT are open. Thus, all normally closed FT contacts are now closed and all normally open FT contacts are now open. Thus, for example, in FIGURE 7, the normally closed FT contacts in the circuit of the oil solenoid switch 4 are now closed thereby establishing a permissive circuit for the fuel oil solenoid. Further, the normally open FT contacts in the circuit of the MT relay coil are now open so as to de-energize the MT relay coil. De-energization of relay coil MT results in opening the normally open relay contacts MT in the circuits of green lamps 112*g*, 110*g*, 106*g* and 104*g*, which represent mills "A" through "E," respectively. Further, de-energization of relay coil MT closes normally closed contacts MT in the circuit of lamps 113*r*, 111*r*, 109*r*, 107*r* and 105*r*, respectively, representing pilot torches "A" through "E."

(8) Opening of the main oil valve, represented by lamps 120*r* and 119*g*, is simulated by placing main fuel oil valve switch 4 in the "open" position. The main oil valve is conventionally a master safety shut-off supply valve for the oil feeding the mill pilot torches and oil guns. By so positioning switch 4 (FIGURE 7) green lamp 119*g* and white alarm lamp 74*w* are de-energized, lamp 120*r* is energized to indicate that the valve is open, and relay coil 630 is energized via normally closed contacts FT and 86–12. Thus, all normally open contacts 630 are closed and all normally closed contacts 630 are open. For example, normally open contacts 630 in the circuit of red lamps 114*r*, 115*r*, 116*r*, 117*r* and 118*r* are closed establishing a mill pilot torch permissive interlock. Further, energization of relay coil 630 opens normally closed contacts 630 in the circuit of boiler trip alarm lamp 73*w*. Still further, energization of relay coil 630 opens normally closed contacts 630 in the circuit of lamp 121*g*, representing oil guns.

(9) At this point in the sequence of operation, the simulator is now in condition to simulate ignition in the boiler. Ignition of the fuel oil gun, represented by lamps 121*g* and 122*r*, is simulated by placing oil gun switch 5 in the "on" position. Fuel oil guns, or burners, are used in a conventional power generating plant to initially warm up the boiler and to keep coal burning conditions stabilized when operating with one mill, i.e., operating on one of a plurality of coal pulverizing and feeding means at low load conditions. By so positioning switch 5 (FIGURE 7), green lamp 121*g* is de-energized and red lamp 122*r* is energized to indicate that the oil gun is operating and the fuel is burning. Further, by so positioning switch 5 red lamp 123*r* will be energized via normally open contacts 630 and PARO which were previously closed in steps 8 and 6, respectively. Red lamp 123*r* represents that the oil pilot torch (FIGURE 1A) is operating. Still further, by so positioning switch 5 a permissive interlock for relay coil OGX is obtained by virtue of contact 5*a* of switch 5. Thus, upon placing any of the mill switches 11, 12, 13, 14 or 15 to an "on" position the relay coil OGX will be energized.

(10) At this stage in the sequence of operation, the simulator is in condition to simulate operation of the turbo generator. Energization of the stator oil pumps, represented by lamps 178*g* and 179*r*, is simulated by placing switch 30 in the "on" position. Conventionally, such oil pumps are used to circulate cooling oil through the generator stator bar windings and to maintain a minimum expansion of material due to a temperature differential existing at various loads on the generator. By so positioning switch 30 (FIGURE 5), green lamp 178*g* is de-energized and red lamp 178*r* is energized via normally closed contacts 86–12 and contact 30*b* of switch 30.

In addition to so positioning the stator oil pump switch 30, simulation of the stator oil system should be made to indicate that the stator oil system is in a normal condition. High oil temperatures of the system are represented by lamp 175*w*, low oil pressure conditions of the system are represented by lamp 176*w* and low oil differential conditions of the system are indicated by lamp 177*w*. Simulation of normal conditions of the stator oil system is had by placing switches 51, 52 and 53 in their "normal" positions. By so positioning swithes 51, 52 and 53 (FIGURE 5) white lamps 175*w*, 176*w* and 177*w* are deenergized so as to indicate that the stator oil system is in a normal condition. Further, by positioning the switches, timer relay coil 62–C1 and relay coil 62–C2 are de-energized. De-energization of timer coil 62–C1 opens the normally open contacts 62–C1 in the circuit of load limit runback cutoff switch 54 (FIGURE 5). De-energization of relay coil 62–C2 releases a portion of the parallel circuit of the load limit runback cutoff switch 54 by opening normally open contacts 62–C2 (FIGURE 6).

(11) Opening of the main stop valves, governor valves, intercept valves and reheat stop valves respectively represented by lamps 137*g* and 138*r*, 139*g* and 140*r*, 141*g* and 142*r*, 143*g* and 144*r* is simulated by respectively placing switches 23, 24, 25 and 26 in the "open" positions. Conventionally all of these valves are part of a main turbine which drives the generator. The valves serve to control admission of steam from the boiler to the turbine, back to the boiler for reheating and then back to the turbine once again, and to isolate the steam from the boiler during normal shut-downs or emergency trip outs. The valves are generally hydraulically operated from the main turbine hydraulic oil supply pumps.

By so positioning switches 23, 24, 25 and 26 (FIGURE 6), green lamps 137*g*, 139*g*, 143*g* and 141*g* will be de-energized and red lamps 138*r*, 140*r*, 144*r* and 142*r* will be energized via a set of normally closed contacts T in the circuit of the red lamps to thereby indicate that the valves are open.

(12) Synchronization of the generator by closing the generator breaker, represented by lamps 173*g* and 174*r*, is simulated by placing switch 27 in the "closed" position. Conventionally in an electric generating plant the generator breaker is the main breaker used to connect the generator output to the line load. It is also used to instantaneously cut off the generator from the line load in the event of electrical side faults or trouble to thereby protect the generator.

By so positioning switch 27 (FIGURE 5), green lamp 173*g* is de-energized and red lamp 174*r* is energized via normally closed contacts 86–12. Further, by so positioning switch 27 relay coil 52A is energized via contact 27*b* of switch 27. Thus, all normally open contacts 52A are closed and all normally closed contacts 52A are opened. For example, the normally open contacts 52A in the circuits of white lamps 162*w*, 163*w*, 136*w* are closed to thereby establish an interlocking circuit for unit trip white alarm lamp 91*w* in the event that simulation is later made of loss of excitation "0" megawatts, or "0" steam flow by respectively placing switch 59 in the "lost" position and switches 60 and 40 in the "0" positions. The significance of such events will be more apparent from the description of simulated conditions and malfunctions which follows.

(13) At this state in the sequence of operation the simulator is in condition for simulating the starting of the "A" and "B" mills. Simulation of ignition of mill pilot torches "A" and "B," respectively represented by lamps 118*r* and 117*r*, is obtained by placing switches 6 and 7 in the "on" position. Conventionally the mill pilot torches or ignitors "A," "B," "C," "D," are small capacity oil burners used to ignite coal from the mill as it is fed into the furnace, or the larger capacity warm up oil burners. By so positioning switches 6 and 7 (FIGURE 7) red lamps 118*r* and 117*r* are respectively energized via the normally open contacts 630 and PARO now closed by virtue of prior steps 8 and 5, to thereby indicate that the "A" and "B" pilot torches are ignited. Further, by so positioning switches 6 and 7 a permissive interlock is established for starting "A" and "B" mills represented by lamps 113*r* and 111*r* respectively.

(14) Starting of "A" and "B" mills, respectively represented by lamps 112*g* and 113*r*, and 110*g* and 111*r*, is simulated by placing switches 11 and 12 in the "on" position. Conventionally, the mills in an electric generating plant are coal pulverizing equipment used to grind coal to a fine powder form and for blowing the powder form with air into the furnace. Five such mills: "A," "B," "C," "D," "E," are shown on display panel portion "A" of FIGURE 1 each, for example, simulating a mill having a capacity of approximately 24 tons per hour.

By so positioning switches 11 and 12 (FIGURE 7) green lamps 112*g* and 110*g* are de-energized and red lamps 113*r* and 111*r* are energized via a set of normally closed contacts MT and the previously closed normally open contacts PARO, as well as by virtue of contacts 6*b* and 7*b* of switches 6 and 7, previously placed in the "closed" or "on" position in step 13. Further, by so positioning switches 11 and 12 the relay coil OGX will be energized via the now closed normally open contacts 630 and PARO, contact 5*a* of switch 5, now closed by virtue of step 9, and either of contacts 11*c* or 12*c* of switches 11 and 12. Energization of relay coil OGX opens the normally closed contacts OGX in the circuit of the FTT–T and FTT–1 relay coils to thereby de-energize relay coils FTT–T and FTT–1 (the FT normally open contacts are now open by virtue of step 7). De-energization of the FTT relay coils results in opening the normally open FTT thirty (30) minutes time delay contacts in the circuit of turbine trip alarm lamp 82*w* to thereby simulate a one-half hour fuel trip period.

(15) Starting of the main turbine driven fan, represented by lamps 100*g* and 101*r*, is simulated by placing switch 3 in the "on" position. Conventionally, the main turbine driven draft fan is a steam driven fan used to supply air for combustion of fuel fed into the furnace. The amount of air fed is automatically controlled in relation to the fuel for maximum efficiency. By so positioning switch 3 (FIGURE 6) green lamp 100*g* is de-energized and red lamp 101*r* is energized via normally closed contacts 86–12T and contact 1*a* of switch 1 (previously closed in step 2) to thereby indicate that the turbine driven fan is operating. Further, by so positioning switch 3, relay coil TDFD, connected in parallel with lamp 101*r*, is also energized. Thus, all normally open TDFD contacts are closed and all normally closed TDFD contacts are open. For example, the normally open TDFD contacts in the purge circuits represented by white lamps 95*w*, 97*w* and 99*w* are now closed. This permits shut-down of the start up fan represented by lamps 102*g* and 103*r* since the above mentioned set of normally opened TDFD contacts are in parallel with a set of normally open SUFD (start up fan driven) contacts in the same purge circuits. Further, by so positioning switch 3 the normally closed TDFD contacts in the circuit of the PARR relay coil are rendered open so as to thereby release a portion of the parallel circuit of the PARR relay coil.

(16) The simulator is now in condition to simulate shut down of the start up fan, represented by lamps 102*g* and 103*r*, the function of which was previously described in step 3. Shut down of the start up fan is simulated by placing the switch 2 in the "off" position. By so positioning switch 2 (FIGURE 6), green lamp 102*g* is energized and red lamp 103*r* and relay coil SUFD are de-energized.

(17) The simulator is now in condition to simulate transferring of power from the start up transformer to the station service transformer by tripping the start up supply breaker, represented by lamps 171*g* and 172*r* (previously described in step 1), and closing the station service breaker, represented by lamps 169*g* and 170*r*, simulated by placing switch 28 in the "closed" position. Conventionally, the station service breaker is an electrical power circuit breaker used to control power flow to the boiler turbine generator equipment from the main generator under normal operating conditions. This makes the unit self-sustaining, i.e., the main generator supplying power to its own auxiliary equipment. Further, in transferring to the station service transformer the start up supply breaker switch 29 is placed in the "tripped" position. By so positioning switches 28 and 29 (FIGURE 5), green lamp 169*g* and red lamp 172*r* are de-energized and red lamp 170*r* and green lamp 171*g* are energized, the latter via a set of normally closed contacts 86–12 to indicate that power is now obtained from the station service transformer.

(18) At this stage in the sequence of operation, the simulator is in condition to simulate complete full loading. Starting of the remaining mill pilot torches, i.e., "C," "D," "E," respectively represented by red lamps 116*r*, 115*r* and 114*r* (previously described in step 13), is simulated by placing switches 8, 9 and 10 in the "on" position. By so positioning switches 8, 9 and 10 (FIGURE 7) red lamps 116*r*, 115*r* and 114*r* are energized via the normally open contacts 630 and PARO, now closed by virtue of steps 8 and 5, respectively.

(19) Starting of the "C," "D" and "E" mills, respectively represented by lamps 108*g* and 109*r*, 106*g* and 107*r* and 104*g* and 105*r* (previously described in step 14), is simulated by placing switches 13, 14 and 15 in the "on" positions. By so positioning switches 13, 14 and 15 (FIGURE 7) green lamps 108*g*, 106*g*, and 104*g* are de-energized and red lamps 109*r*, 107*r* and 105*r* are energized via the now closed normally open contacts 630 and PARO.

(20) Starting of the second boiler feed pump "B," represented by lamps 151*g* and 152*r* (previously described in step 6), is simulated by placing switch 22 in the "on" position. By so positioning switch 22 (FIGURE 6) green lamp 151*g* is de-energized and red lamp 152*r* is energized via a set of normally closed contacts 86–12 to thereby indicate that boiler feed pump "B" is operating. Further, by so positioning switch 22 a portion of the parallel circuit, i.e., contact 22*a* of switch 22, in the load limit runback circuit of contact 54*b* of switch 54 is released.

(21) Shut down of the oil gun and pilot torch, respectively represented by lamps 121*g* and 122*r* and 123*r* (previously described in step 9), and of the mill pilot torches "A" through "E," respectively represented by lamps 118*r*, 117*r*, 116*r*, 115*r* and 114*r* (previously described in steps 13 and 18), is simulated by placing switches 5, 6, 7, 8, 9 and 10 in the "off" positions. By so positioning switches 5, 6, 7, 8, 9 and 10 (FIGURE 7), green lamp 121*g* is energized and red lamps 114*r*, 115*r*, 116*r*, 117*r*, 118*r*, 122*r* and 123*r* are de-energized to thereby indicate that the oil gun and the pilot torches are not operating.

At this stage in the operation sequence the simulator simulates that all conditions are normal for full loading of the power generating plant. Attention will now be directed toward simulation of conditions and malfunctions that might be encountered in the operation of such a plant due to, for example, component failure or lack of proper auxiliary equipment capacity.

(B) SIMULATION OF CONDITIONS AND MALFUNCTIONS

At this stage in the operation, the simulator is in proper condition for simulating various conditions and malfunctions which might occur during the operation of a power generating plant, as depicted in the graphic flow pattern display portion A of FIGURE 1. The simulated conditions and malfunctions are as follows:

(1) Loss of proper combustion air is represented by purge interlock white lamps 94*w* and 96*w*. Lamps 95*w* and 97*w* represent high air flow and lamps 94*w* and 96*w* represent low air flow. Conventionally, purge interlocks are provided to insure adequate scavenging of combustibles from the furnace before oil or coal is admitted and ignited. The primary purpose of purging is to prevent boiler furnace explosions during the initial light-off or during normal operation, if insufficient air prevails.

Loss of proper combustion air is simulated by placing "A" and "B" purge switches in the "low" positions. By so positioning switches 31 and 32 (FIGURE 6) white lamps 95*w* and 97*w* are de-energized and white lamps 94*w* and 96*w* are energized to indicate low air flow. Further, by so positioning switches 31 and 32, relay coil PARO is de-energized and relay coil PARR is energized via contact 32*a* of switch 32 and contact 31*a* of switch 31. Energization of relay coil PARR closes the normally open PARR contacts in the circuit of the PART timer relay coil (FIGURE 7) to thereby energize low air flow alarm lamp 75*w*, and energize timer relay coil PART. Energization of low air flow alarm lamp 75*w* (alarm portion B of FIGURE 1) indicates that a state of insufficient combustion air is being supplied for the fuel fed to the boiler. The indication may also represent that a restriction of necessary air flow is developing in the furnace itself, or in the supply or discharge ducts, demanding maintenance inspection.

Energization of timer relay coil PART closes the normally open relay contacts PART in the circuit of relay coil FT (FIGURE 7) to thereby energize the relay coil FT and boiler trip alarm lamp 73*w*. Energization of boiler trip or fuel trip alarm lamp 73*w* (alarm portion B of FIGURE 1) indicates that all mill motors are tripped and that the main fuel oil solenoid valve is closed not permitting the flow of fuel oil to both the mill pilot torches and the oil guns.

Energization of relay coil FT also closes the normally open contacts FT in the circuit of the FTT–T and FTT–1 relay coils (FIGURE 7) to thereby energize the FTT–T and FTT–1 coils. These relay coils are time delay relays representative of a thirty (30) minutes time delay, after which the normally open FTT contacts in the circuit of relay coil T and turbine trip alarm lamp 82*w* (FIGURE 6) are closed to thereby energize relay coil T and alarm lamp 82*w*. Turbine trip alarm lamp 82*w*, when energized, indicates that all stop valves, control valves and intercept valves are closed, i.e., all turbine hydraulic control valves are closed preventing steam from entering the turbine.

Energization of relay coil FT opens the normally closed FT contacts in the circuit of relay coil 630 (FIGURE 7) to thereby de-energize relay coil 630. De-energization of relay coil 630 causes the normally open contacts 630 in the circuit of pilot torch lamps 114*r*, 115*r*, 116*r*, 117*r* and 118*r* to be open, thereby de-energizing the pilot torch red lamps to indicate that the pilot torches are not operating. Further, de-energization of relay coil 630 closes the normally closed relay contacts 30 in the circuit of boiler trip alarm lamp 73*w*. If re-starting procedure is accomplished within one-half hour, i.e., going through purge sequence, wash out of the turbine trip will occur since, as previously described, the FTT–T relay coils simulate a thirty (30) minutes time delay before closure of the FTT contacts in the circuit of turbine trip relay coil T (FIGURE 6).

Energization of relay coil FT also closes the normally open contacts FT in the circuit of the relay coil MT to thereby energize relay coil MT. Energization of relay coil MT results in closure of the normally open contacts MT in the circuits of mill green lamps 104*g*, 106*g*, 108*g*, 110*g* and 112*g* (FIGURE 7) to thereby energize the mill green lamps indicating that the mills "A" through "E" are not operating.

(2) Fan discharge pressure low condition, is represented by low air pressure lamp 98w. Simulation of fan discharge pressure low, which initiates fuel or boiler trip conditions, is obtained by placing switch 34 in the "low" position. By so positioning switch 34 (FIGURE 7) relay coil FT and lamp 98w are energized. Energization of relay coil FT produces the same effects and results as described in step B–1.

(3) Boiler circulating water differential pressure low condition, represented by lamp 135w, refers to the differential condition developed across the boiler circulating tube sections by the boiler circulating pumps. A low condition is simulated by placing switch 38 in the "low" position. By so positioning switch 38 (FIGURE 7) lamp 135w and relay coil FT are energized. Energization of relay coil FT produces the same effects and results as described in step B–1.

(4) One mill running without oil guns, represented by alarm lamp 72w, is the boiler trip condition in the pulverizing mill operation when the main oil solenoid is closed. This is simulated by placing switch 35 in the "on" position. By so positioning switch 35 (FIGURE 7) one mill running alarm lamp 72w, boiler trip alarm lamp 73w and relay coil FT are energized. Energization of the relay coil FT produces the same effects and results as described in step B–1.

(5) High furnace pressure trip condition, represented by lamp 124w, refers to high pressure in the furnace resulting from gases of combustion and the abnormal restricted flow of these gases to the stack. This condition is simulated by placing switch 39 in the "high" position. By so positioning switch 39 (FIGURE 7) white lamp 124w and timer relay coil HFPT are energized. Energization of timer relay coil HFPT closes the normally open HFPT contacts in the circuit of the FT relay coil to thereby energize the FT coil. Energization of relay coil FT produces the same effects and results as described in step B–1.

(6) High drum level condition, represented by lamp 125w, is indicative of the high water level in the steam drum of the boiler. The high level point being the level in the boiler drum which may cause adverse operating conditions such as carry-over of water with the stream to the superheater and turbine. This condition is simulated by placing switch 36 in the "high" position. By so positioning switch 36 (FIGURE 7) lamp 125w and relay coil DLH are energized. Energization of relay coil DLH results in the closure of the normally open contacts DLH in the circuit of relay coil T and turbine trip alarm lamp 82w (FIGURE 6) to thereby energize relay coil T and alarm lamp 82w. Energization of relay coil T results in closure of the normally open contacts T in the circuit of relay coil FT to thereby energize relay coil FT. Energization of relay coil FT produces the same effects and results as described in step B–1.

(7) Overspeed conditions of the turbine, represented by lamp 156w, refers to speed of approximately of 8 to 10% over normal conditions. Conventionally, the normal turbine speed is substantially 3,600 r.p.m. Overspeed is simulated by placing switch 50 in the "high" position. By so positioning switch 50 (FIGURE 6) lamp 156w and relay coil T are energized. Energization of relay coil T produces the same effects and results as described in steps B–1 and B–6.

(8) Low vacuum condition, represented by lamp 158w, refers to a vacuum pressure in the range of 18 to 20 inches Hg. Conventionally, the normal pressure to which steam from the turbine is exhausted to secure maximum energy is 28 inches Hg. Knowledge of a lower than normal vacuum pressure is necessary to protect the exhaust or low pressure sections of the turbine from over heating.

Low vacuum conditions are simulated by placing switch 49 in the "low" position. By so positioning switch 49 (FIGURE 6), lamp 158w and relay coil T are energized. Energization of relay coil T produces the same effects and results as described in steps B–1 and B–6.

(9) Tripping of the turbine manual lever, represented by lamp 155w, refers to a lever conventionally located on the front end of the main turbine and used for manual emergency shut-down of the turbine. Simulation of tripping the manual lever is obtained by placing switch 47 in the "trip" position. By so positioning switch 47 (FIGURE 6), lamp 155w and relay coil T are energized. Energization of relay coil T produces the same effects and results as described in steps B–6 and B–1.

(10) Operation of the turbine trip remote pushbutton, represented by lamp 157w, refers to a remotely operated turbine tripping device which is similar in purpose to that of the manual lever, described in step B–9. The pushbutton, when actuated, serves to shut down the turbine by dumping the hydraulic oil and shutting all steam valves on the turbine.

Actuation of the turbine trip remote pushbutton is simulated by placing switch 46 in the "trip" position. By so positioning switch 46 (FIGURE 6) lamp 157w and relay coil T are energized. Energization of relay coil T produces the same effects and results as described in steps B–6 and B–1.

(11) Thrust bearing failure, represented by lamp 145w, refers to failure of the bearing on the main turbine generator unit used to maintain desired rotating spindle clearances. Excessive wear of the bearing could cause rubbing of the turbine blades resulting in a complete shut down of the unit.

Simulation of thrust bearing failure is obtained by placing switch 48 in the "fail" position. By so positioning switch 48 (FIGURE 6) lamp 145w and relay coil T are energized. Energization of relay coil T produces the same effects and results as described in steps B–6 and B–1.

(12) Reduction of generator load to "0" megawatts, represented by lamp 163w, is simulated by placing switch 60 in the "zero" position. By so positioning switch 60 (FIGURE 5), if turbine trip relay coil T has been previously energized, as in steps B–1 through B–11, closure of the normally open contacts T along with closure of switch 60 energizes relay coil 86–12 and time delay relay coil 86–12TT, and also alarm lamp 91w. Energization of unit trip alarm lamp 91w indicates that both the turbine and the boiler have been tripped and thereby the generator oil circuit breaker, voltage regulator, and the field breaker are tripped open. Further, such a unit trip indicates that selected plant auxiliaries are disconnected from the generator and transferred to the start up source of power. Also such a unit trip indicates that the drive turbines for the boiler feed pumps are tripped, and the drive turbine for the FD fans is tripped after a time delay.

Energization of time delay relay coil 86–12TT causes closure of normally open contacts 86–12TT in the circuit of relay coil 86–12T to thereby energize relay coil 86–12T. Energization of relay coil 86–12T closes the normally open contacts 86–12T in the circuit of the turbine driven forced draft fan lamp 100g to thereby energize lamp 100g (FIGURE 6). Energization of relay coil 86–12T also opens the normally closed contacts 86–12T in the circuit of turbine driven fan lamp 101r and relay coil TDFD (FIGURE 6) to thereby de-energize lamp 101r and relay coil TDFD. De-energization of relay coil TDFD opens the normally open contacts TDFD in the circuit of purge lamps 95w, 99w and 97w. Further, de-energization of relay coil TDFD closes the normally closed contacts TDFD in the circuit of the PARR relay coil so that upon de-energization of relay coil SUFD energization of relay coil PARR will result.

Energization of relay coil 86–12 (FIGURE 5) opens the normally closed contacts 86–12 in the circuit of generator breaker lamp 174r, station service breaker lamp 170*r*, start up supply breaker lamp 171*g* and stator oil pump lamp 179*r* (FIGURE 5) as well as opening the normally closed contacts 86–12 in the circuits of boiler feed pump lamps A and B, i.e., lamps 154*r* and 152*r* (FIGURE 6) so as to de-energize these lamps. Energization of relay coil 86–12 also closes the normally open contacts 86–12 in the circuits of station service breaker lamp 169*g*, generator breaker lamp 173*g*, start up supply breaker lamp 172*r* and stator oil pump lamp 178*g* (FIGURE 5), as well as the normally open contacts 86–12 in the circuits of boiler feed pump lamps 153*g* and 151*g* (FIGURE 6) so as to thereby energize these lamps.

(13) A sudden pressure increase in the main transformer, represented by lamp 164*w*, refers to a sudden increase in pressure in the main power transformer cooling oil pressure system due to a fault, such as a winding failure. This is simulated by placing switch 64 in the "high" position. By so positioning switch 64 (FIGURE 5) lamp 164*w*, as well as unit trip alarm lamp 91*w*, relay coil 86–12 and relay coil 86–12TT are energized. Energization of relay coils 86–12 and 86–12TT produces the same effects and results as described in step B–12.

(14) A sudden pressure increase in the station service transformer, represented by lamp 166*w*, refers to a sudden increase in the cooling oil pressure system due to a fault, such as a winding failure. This is simulated by placing switch 62 in the "high" position. By so positioning switch 62 (FIGURE 5), lamp 166*w*, unit trip alarm lamp 91*w*, relay coil 86–12 and relay coil 86–12TT are energized. Energization of relay coils 86–12 and 86–12TT produces the same effects and results as described in step B–12.

(15) Neutral current conditions of the station service transformer, represented by lamp 167*w*, refers to current flow in the conventionally neutral lead of the station service transformer. This is simulated by placing switch 61 in the "ground" position. By so positioning switch 61 (FIGURE 5) lamp 167*w*, unit trip alarm lamp 91*w* and relay coils 86–12 and 86–12TT are energized. Energization of relay coils 86–12 and 86–12TT produces the same effects and results as described in step B–12.

(16) Overload conditions of the station service transformer, represented by lamp 168*w*, refers to an overload condition resulting in excessive current flow. This is simulated by placing switch 63 in the "overload" position. By so positioning switch 63 (FIGURE 5) lamp 168*w*, unit trip alarm lamp 91*w* and relay coils 86–12 and 86–12TT are energized. Energization of relay coils 86–12 and 86–12TT produces the same effects and results as described in step B–12.

(17) Overall differential conditions, represented by lamp 165*w*, refers to an overall differential or unbalance of current flow across the main generator and main transformer. This is simulated by placing switch 58 in the "high" position. By so positioning switch 58 (FIGURE 5), lamp 165*w*, unit trip alarm lamp 91*w* and relay coils 86–12 are energized. Energization of relay coils 86–12 and 86–12TT produces the same effects and results as described in step B–12.

(18) High generator differential current flow, represented by lamp 160*w*, refers to excessive current flow across the main generator. This is simulated by placing switch 57 in the "high" position. By so positioning switch 57 (FIGURE 5) lamp 160*w*, unit trip alarm lamp 91*w*, and relay coils 86–12 and 86–12TT produces the same effects and results as described in step B–12.

(19) Generator ground conditions, represented by lamp 161*w*, refers to ground faults conditions, which in a conventional power plant activate a voltage relay across a loading resistor of the generator grounding transformer to initiate a unit trip of the generator, the turbine and the boiler. This is simulated by placing switch 56 in the "ground" position. By so positioning switch 56 (FIGURE 5), lamp 161*w*, unit trip alarm lamp 91*w* and relay coils 86–12 and 86–12TT are energized. Energization of relay coils 86–12 and 86–12TT produces the same effects and results as described in step B–12.

(20) Faults in the 132,000 kv. high voltage line relay protection circuit, represented by lamp 181*w*, are simulated by placing switch 65 in the "trouble" position. By so positioning switch 65 (FIGURE 5) lamp 181*w*, lamp 91*w* and relay coils 86–12 and 86–12TT are energized. Energization of relay coils 86–12 and 86–12TT produces the same effects and results as described in step B–12.

(21) Loss of excitation, represented by lamp 162*w*, refers to loss of the D.C. power used to excite the field of the main generator, conventionally 375 volts D.C. Loss of the excitation is simulated by placing switch 59 in the "lost" position. By so positioning switch 59 (FIGURE 5) white lamps 162*w* and 91*w*, and relay coils 86–12 and 86–12TT are energized. Energization of relay coils 86–12 and 86–12TT produces the same effects and results as described in step B–12.

(22) Zero steam flow plus exhaust hood temperature at 225° F., represented by lamps 136*w* and 159*w*, refers to the dual conditions of no steam flow to the main turbine and the temperature of the last turbine section before the steam condenser, which is conventionally limited by design requirements to approximately 225° F. These conditions are simulated by placing switch 40 in the "0" position and placing switch 55 in the "high" position. By so positioning switches 40 and 55 (FIGURE 5), lamps 136*w*, 159*w*, 91*w* and relay coils 86–12 and 86–12TT are energized. Energization of relay coils 86–12 and 86–12TT produces the same effects and results as described in step B–12.

(23) Start up transformer neutral condition, represented by white lamp 183*w*, refers to the start up power transformer protection using neutral current flow as an indication of a fault. Such a fault is simulated by placing switch 66 in the "high" position. By so positioning switch 66 (FIGURE 5) lamp 183*w* and relay coil 86–4 are energized. Energization of relay coil 86–4 opens the normally closed contacts 86–4 in the circuit of lamp 172*r* to thereby de-energize lamp 172*r*. Further, energization of relay coils 86–4 closes the normally open contacts 86–4 in the circuit of lamp 171*g* to thereby energize lamp 171*g*. Still further, energization of relay coil 86–4 closes a set of normally open contacts 86–4 in the circuit of lamp 91*w* and relay coils 86–12 and 86–12TT to thereby energize lamp 91*w* and relay coils 86–12 and 86–12TT. Energization of relay coils 86–12 and 86–12TT produces the same effects and results as described in step B–12.

(24) Start up transformer sudden pressure increase, represented by lamp 184*w*, refers to a sudden increase in the cooling oil pressure system due to a fault, such as a winding failure. Such a sudden pressure increase is simulated by placing switch 67 in the "high" position. By so positioning switch 67 (FIGURE 5) lamp 184*w* and relay coil 86–4 are energized. Energization of relay coil 86–4 produces the same effects and results as described in steps B–23 and B–12.

(25) Fault in the 11 kv. start up supply protection circuit, represented by lamp 182*w*, is simulated by placing switch 68 in the "trouble" position. By so positioning switch 68 (FIGURE 5) lamp 182*w* and relay coil 86–4 are energized. Energization of relay coil 86–4 produces the same effects and results as described in steps B–23 and B–12.

(26) Stator oil temperature high condition, represented by lamp 175*w*, refers to the temperature of the stator cooling oil measured at the generator armature winding outlet. Simulation of high stator oil temperature is obtained by placing switch 51 in the "high" position. By so positioning switch 51 (FIGURE 5) lamp 175, timer relay coil 62–C1 and relay coil 62–C2 are energized. Energization of timer relay coil 62–C1 after simulating a three minute time delay closes normally open contacts 62–C1 in the circuit of load limit runback cutoff switch 54 (FIGURE 5). Thus when switch 54 is placed in the "normal" position lamp 91*w*, relay coils 86–12 and 86–12TT are energized. Energization of relay coils 86–12 and 86–12TT produces the same results and effects as described in Step B–12.

Energization of relay coil 62–C2 closes normally open contact 62–C2 in the circuits of load limit runback alarm lamp 86*w* and lamp 146*w* (FIGURE 6) so that upon positioning switch 54 in the "normal" position, lamps 86*w* and 146*w* are energized.

Load limit runback alarm lamp 86*w*, when energized, indicates a condition whereby the main turbine generator load is reduced automatically through a motor driven mechanism in the turbine generator control when preset limits on the equipment are exceeded. These preset limits are certain generator stator oil cooling temperatures and pressures, as well as loss of boiler feed pump capacity.

(27) Stator oil pressure low, represented by lamp 176*w* refers to the stator cooling oil pressure, measured at the discharge of the pumps in the stator oil cooling loop. A low condition is simulated by placing switch 52 in the "low" position. By so positioning switch 52 (FIGURE 5) lamp 176*w* and relay coils 62–C1 and 62–C2 are energized. Energization of relay coils 62–C1 and 62–C2 produces the same effects and results as described in step B–26.

(28) Stator oil differential low, represented by lamp 177*w*, refers to the differential pressure developed across the stator armature windings of the main generator. A low differential indicates a lock of cooling oil flow. Such a low differential is simulated by placing switch 53 in the "low" position. By so positioning switch 53 (FIGURE 5) lamp 177*w* and relay coils 62–C1 and 62–C2 are energized. Energization of relay coils 62–C1 and 62–C2 produces the same effects and results as described in step B–26.

(29) High load reject, represented by lamp 180*w*, refers to the condition of instantaneous unloading of the generator. This is simulated by placing switch 45 in "reject" position. By so positioning switch 45 (FIGURE 6) lamp 180*w*, relay coil HLR and time delay relay coil HLR–T are energized. Energization of relay coil HLR closes the normally open contacts HLR in the circuits of intercept valve lamp 143*g* and governor lamp 139*g* to thereby energize lamps 139*g* and 143*g*. Further, energization of relay coil HLR opens the normally closed contacts HLR in the circuits of governor lamp 140*r* and intercept valve lamp 144*r*.

Energization of relay coil HLR–T, after a simulated time delay of five seconds, closes the normally open contacts HLRT in the circuit of relay coil FT (FIGURE 7) to thereby energize relay coil FT. Energization of relay coil FT produces the same effects and results as described in Step B–1.

(30) Turbine bearing oil pressure low condition, represented by lamp 149*w*, refers to low lubrication pressure at the main turbine bearing. This condition is simulated by placing switch 44 in the "low" position. By so positioning switch 44 (FIGURE 6) lamp 149*w* is energized to indicate the low oil pressure condition.

(31) Hydraulic header pressure low conditions, represented by lamp 150*w*, refers to low pressure conditions of the oil used in the turbine governor control system for operation of the turbine valves. The low oil pressure conditions are simulated by placing switch 42 in the "low" position. By so positioning switch 42 (FIGURE 6) lamp 150*w* is energized to indicate the low oil pressure conditions.

(32) Turbine oil level high-low conditions, represented by lamp 148*w*, refers to the deviation from the normal level of the oil in the turbine system storage tank. The oil is used for bearing lubrication and in the hydraulic control system. Either high or low level deviations from the normal level are simulated by placing switch 43 in the "high-low" position. By so positioning switch 43 (FIGURE 6) lamp 148*w* is energized to indicate that the level of oil in the storage tank deviates from the normal level.

(33) Operation of the initial pressure regulator, represented by lamp 147*w*, refers to the conventionally used pressure control on the main turbine generator which automatically reduces the load if the boiler pressure starts to decay to a predetermined level. The regulator protects the turbine from possible carry over of water and rapid decay of boiler pressure and temperatures. Operation of the regulator is simulated by placing switch 41 in the "operation" position. By so positioning switch 41 (FIGURE 6) lamp 147*w* will be energized to indicate that the regulator is operating.

(34) Drum level low conditions, represented by lamp 126*w*, refers to a low water level in the steam drum of the boiler. Such a low level is simulated by placing switch 37 in the "low" position. By so positioning switch 37 (FIGURE 7) lamp 126*w* is energized to indicate that the level of water in the steam drum is low.

Although this invention has been particularly described with respect to the simulation of the structural arrangement and operation of an electrical power generating plant, it should be readily understood that the invention is not limited thereto, but encompasses simulation of other functional systems. Accordingly, the components of the simulated plant are to be considered as illustrative and not in a limiting sense. Similarly, the invention is not limited to the specific circuitry and indicating means disclosed.

I claim:

1. Apparatus for simulating the correct start up procedures required to start up a functional system comprising a series of operating components from a nonoperative condition to an operative normal running condition in which said components are brought into operation in a predetermined sequence and comprising:

a panel having a display portion graphically illustrating various components of said system;

first and second lamps located adjacent each illustrated component for respectively representing a nonoperating and an operating condition of said component;

a plurality of start up switches each having a first and second position respectively representative of a component nonoperating condition and a component operating condition;

a circuit connecting said start up switches with said lamps and a source of energizing voltage;

said circuit including sequence responsive controlling means for controlling energization of said second lamps only in response to a predetermined sequence of positioning said switches from said first to said second positions, whereby if said predetermined sequence is not followed energization of all of said second lamps will not occur representative that the correct start up procedures have not been followed;

said sequence responsive controlling means includes relays having relay coils and associated relay contacts operated by said relay coils, said relay coils being electrically connected with selected ones of said start up switches; and, said associated relay contacts being connected in series with selected ones of said start up switches and selected ones of said second lamps, whereby said selected second lamps will be energized upon positioning of said selected switches to the second position only when said associated relay contacts are closed by said associated relay coils.

2. An apparatus as set forth in claim 1 including timing means and switching means controlled thereby, each said timing means being connected to said voltage source by one of said associated relay contacts to commence timing a predetermined period of time upon opening of said relay contacts and controlling the operation of a said switching means upon the termination of said period of time.

3. Apparatus for simulating the correct start up procedures for a boiler of a power generating plant and comprising:

a voltage source;

a first lamp representative, when energized, of a stack breeching damper being open;

a first double pole switch having two poles simultaneously movable betwen a first and second switch position, one of said poles connecting said first lamp across said source when said first switch is in its second position to thereby energize said first lamp;

a second lamp representative, when energized, of a start up draft fan being on;

a second single pole switch movable between first and second positions, said second switch and said other pole of said first switch being connected together in series with said second lamp across said source so that said second lamp will be energized only when both said first and second switches are each in their second position;

a first relay having a normally de-energized relay coil and a set of normally open relay contacts which become closed upon energization of said relay coil, said relay coil being connected in series with said other pole of said first switch and said second switch across said voltage source, whereby said relay coil will become energized when both said first and second switches are in their second position;

a third lamp representative, when energized, of placing a differential across an economizer;

a third double pole switch movable between a first and second position, one of said poles being connected in series with said third lamp and said normally open relay contacts of said first relay across said source so that said third lamp will be energized only when the relay coil of said first relay is energized and said third switch in is in its second position.

4. Apparatus as set forth in claim 3 including:

a fourth double pole double throw switch movable between a first and second position;

a fifth double pole double throw switch movable between a first and second position;

a second relay having a relay coil connected across said source by said fourth and fifth switches for energization thereby when said fourth and fifth switches are in their first position;

said second relay having a set of contacts closed upon energization of said second relay coil and connected in series with a parallel circuit across said source;

said parallel circuit including a fourth lamp representative of low air flow and a relay coil of a two minute time delay relay, whereby upon positioning said fourth or fifth switch in its second position said second relay will become de-energized to open its set of contacts so that said fourth lamp will become de-energized and said time delay relay will time a simulated system purging period of two minutes and then become de-energized.

5. Apparatus for simulating malfunction and alarm conditions during the operation of a power generating plant and comprising:

a voltage source;

a first lamp representative, when energized, of loss of proper combustion air due to low air flow;

a first and second switch each having a first position and a second position;

said first lamp connected in series with one of said first and second switches across said source for energization thereby when said one switch is in its first position;

a first relay having a relay coil and a set of contacts closed upon energization of said coil, said coil being connected in series with said first and second switches across said source for energization thereby when said both switches are in their first position;

a second relay having a relay coil and a set of contacts closed upon energization of said coil, said coil being connected in series with said set of contacts of said first relay across said source to thereby energize said second relay coil upon energization of said first relay coil;

a second lamp representative, when energized, of a boiler trip alarm condition, said second lamp being connected in series with said set of contacts of said second relay whereby said second lamp becomes energized upon energization of said relay coil.

6. Apparatus as set forth in claim 5 including:

a third relay having a relay coil and a set of contacts closed upon energization of said coil, said coil being connected in parallel with said second lamp for energization upon energization of said second relay coil;

a fourth time delay relay having a relay coil and a set of contacts closed after a given period of time has elapsed from energization of said coil, said coil being connected in series with said set of contacts of said third relay for energization of said coil upon energization of said third relay coil; and, a third lamp representative, when energized, of a turbine trip alarm condition, said third lamp being connected in series with said set of contacts of said fourth relay whereby said third lamp will become energized after a given period of time has elapsed from energization of said fourth time delay relay coil.

References Cited by the Examiner

UNITED STATES PATENTS

| | | | |
|---|---|---|---|
| 2,173,400 | 9/1939 | Shaw | 35—49 |
| 3,047,964 | 8/1962 | Fried | 35—10 |
| 3,061,945 | 11/1962 | Hawkins | 35—13 |
| 3,146,533 | 9/1964 | Carmody | 35—10 |

JEROME SCHNALL, *Primary Examiner.*

HARLAND S. SKOGQUIST, *Assistant Examiner.*